United States Patent [19]

Takenaka et al.

[11] Patent Number: 5,432,417
[45] Date of Patent: Jul. 11, 1995

[54] LOCOMOTION CONTROL SYSTEM FOR LEGGED MOBILE ROBOT

[75] Inventors: Toru Takenaka; Masao Nishikawa, both of Saitama, Japan

[73] Assignee: Honda Giken Kogyo Kabushiki Kaisha, Tokyo, Japan

[21] Appl. No.: 56,067

[22] Filed: Apr. 30, 1993

[30] Foreign Application Priority Data

Apr. 30, 1992 [JP] Japan .................................. 4-137880
Apr. 30, 1992 [JP] Japan .................................. 4-137884

[51] Int. Cl.⁶ ................................................. B25J 9/06
[52] U.S. Cl. ......................... 318/568.12; 318/568.22; 180/8.6; 395/95; 901/1; 901/9
[58] Field of Search .................... 318/568.11, 568.12, 318/568.16, 568.17, 568.18, 568.2, 568.22; 180/8.1, 8.6; 395/80, 93, 95, 96; 901/1, 9

[56] References Cited

U.S. PATENT DOCUMENTS

| | | | |
|---|---|---|---|
| 5,151,859 | 9/1992 | Yoshino et al. | 364/424.02 |
| 5,206,569 | 4/1993 | Ozawa | 318/568.12 |
| 5,221,883 | 6/1993 | Takenaka et al. | 318/568.12 |
| 5,252,901 | 10/1993 | Ozawa et al. | 318/568.12 |
| 5,343,397 | 8/1994 | Yoshino et al. | 364/424.02 |

FOREIGN PATENT DOCUMENTS 6297006  5/1987  Japan .
384782   8/1991  Japan .

*Primary Examiner*—Bentsu Ro
*Attorney, Agent, or Firm*—Lyon & Lyon

[57] ABSTRACT

A locomotion control system for a biped walking robot having a body and two legs each connected to the body through a hip joint and each having ankle joint adjacent to its foot portion. A walking patter is preestablished in advance in terms of a trajectory of IMP (Zero Moment Point) at which horizontal moment acting on the robot generated by the ground reaction force is zero, a trajectory of the body's attitude or the like. During walking, actual ground reaction force is detected to determine an actual ZMP position and detected position is compared with a target IMP position obtained from the IMP trajectory. When there is an error between the positions, the robot legs are driven in such a manner that the error decreases. More specifically, if the actual IMP position is shifted forward the target ZMP position, the moment produced therefrom causes the robot to tilt backward. Therefore, it is controlled such that the forward foot is lifted vertically, while the rearward foot is lowered vertically, thus producing a moment in the opposite direction to restore the stable attitude. The robot can therefore be simulated as an inverted pendulum so that constantly maintains a prescribed restoration force and control characteristics becomes liner. Various embodiments are proposed for the same purpose. Alternatively, output rate of time series data is changed in response to the robot's unstable attitude.

38 Claims, 30 Drawing Sheets

FIG. 6A
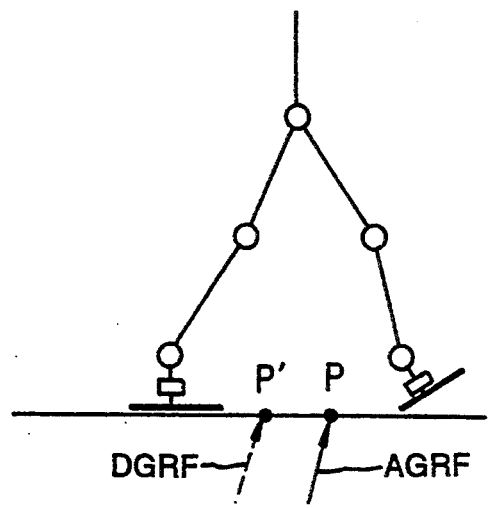
FIG. 6B
FIG. 6C
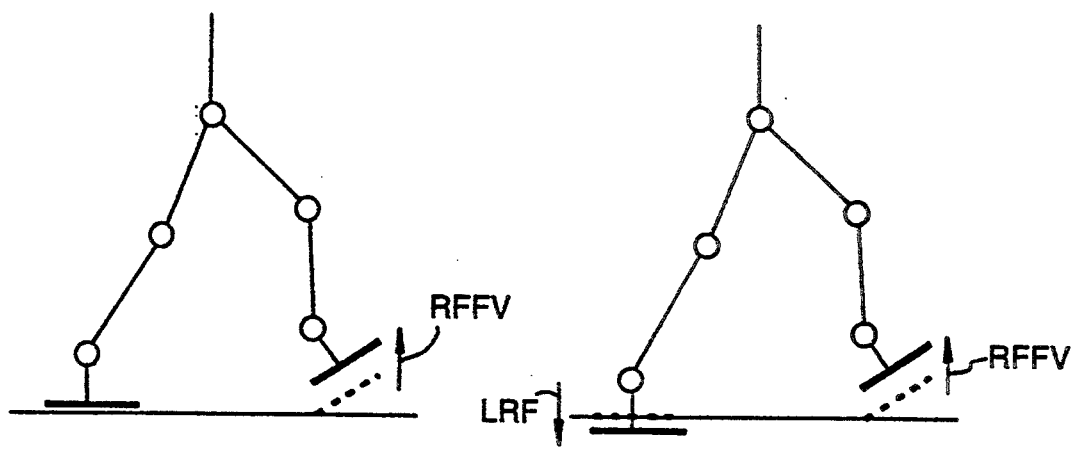
FIG. 6D
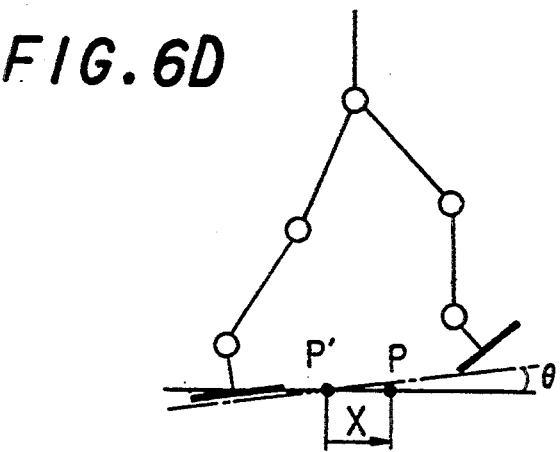

Calculate moment M about origin $$\vec{M} = \vec{r1} \times \vec{F1} + \vec{r2} \times \vec{F2}$$

(Where X : Vector product)

$$\vec{F} = \vec{F1} + \vec{F2}$$

Calculate L satisfying $\vec{M} = \vec{L} \times \vec{F}$

Leg compliance control spring constant : $\dfrac{1}{1/Kleg + Kf}$

LOCOMOTION CONTROL SYSTEM FOR LEGGED MOBILE ROBOT

BACKGROUND OF THE INVENTION

1. Field of the Invention

This invention relates to a control system for a legged mobile robot, more particularly to such a system for enabling a biped walking robot to walk stably even over terrain with unexpected irregularities.

2. Description of the Prior Art

Legged mobile robots are known to the art. See the teaching of Japanese Laid-open Patent Publication No. 62(1987)-97,006, for example.

Compared with wheeled, crawler and other types of robots, the legged mobile robot experiences greater variation in its support polygon and, accordingly, is more susceptible to attitude instability. This particularly true of the biped robot.

SUMMARY OF THE INVENTION

The first object of the invention is therefore to provide a control system for a legged mobile robot which enables the robot to walk while constantly maintaining a stable attitude irrespective of any irregularities such as bumps and depressions or inclinations that may be present in the terrain being navigated.

Moreover, to be able to walk stably, a legged mobile robot is required to satisfy prescribed dynamic stability conditions. These conditions can be met either by solving dynamic problems in real time as they are encountered during locomotion or by solving the problems in advance. For realizing either method, the robot has to be mathematically modeled. While the model should preferably approximate or simulate the actual robot with a high degree of accuracy, this is hard to achieve in actual practice. Since numerous factors involved are difficult to model and because of various other restrictions, such as the need to shorten processing time or reduce the labor required for creating the model, the model used is invariably only an approximate one.

The second object of the invention is therefore to provide a control system for a legged mobile robot which enables linearization of the robot's control system by maintaining the robot's attitude restoration force as constant as possible so that the robot can be simulated as an inverted pendulum that constantly maintains a prescribed restoration force.

Further, since a legged mobile robot walks while maintaining a balance between the force of reaction it receives from the ground and the resultant of the weight and inertial force it exerts on the ground, any large impact occurring at the time of footfall may disturb the robot's attitude and make stable walking impossible.

The third object of the invention is therefore to provide a control system for a legged mobile robot which minimizes the footfall impact the robot receives so as to enable the robot to maintain a stable attitude during walking.

For realizing these objects, the present invention provides a system for controlling locomotion of a legged mobile robot having a body and a plurality of articulated legs each connected to the body through a first joint and each having at least a second joint, comprising motor means provided at the individual joints, first means for determining control values of the motor means in accordance with a walking data preestablished at least on a trajectory of ZMP (Zero Moment Point) at which horizontal moment acting on the robot generated by ground reaction force is zero, second means for detecting ground reaction force actually acting on the robot to determine an actual position of the ZMP, third means for comparing the actual position of the ZMP with a target position of the ZMP obtained from the trajectory of the ZMP to determine an error therebetween and control means for providing the determined control value to said motor means to drive the individual joints and when the error is determined, correcting at least one of the control values in such a manner that the error decreases.

BRIEF DESCRIPTION OF THE DRAWINGS

The above and other objects and advantages of the invention will be more apparent from the following description and drawings, in which:

FIGS. 6A, 6B, 6C and 6D are views similar to FIG. 5 for explaining the leg compliance control of FIG. 4;

DETAILED DESCRIPTION OF THE PREFERRED EMBODIMENTS

Embodiments of the invention will now be explained based on a biped walking robot as an example of a legged mobile robot.

Figure 1:
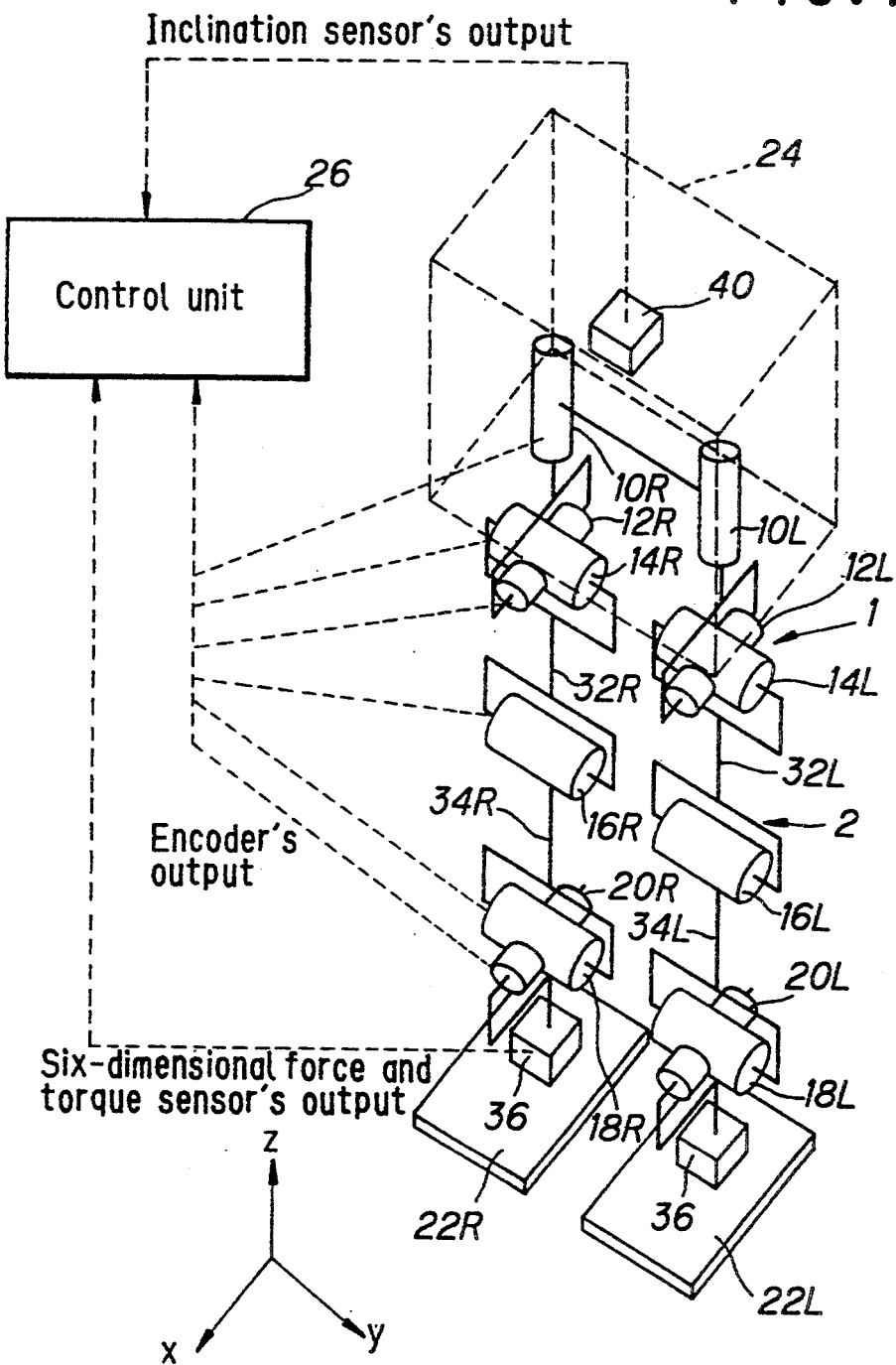
FIG. 1 is a schematic view showing the overall configuration of a locomotion control system for a legged mobile robot according to the invention.

An overall skeleton view of a biped walking robot 1 is shown in FIG. 1. The robot 1 has left and right legs each having six joints (axes). (To make the arrangement easier to understand, the joints (axes) are represented as the electric motors by which they are driven.) The six joints (axes) are, starting at the top, joints (axes) 10R, 10L for swiveling (generally horizontal rotation) of the legs at the hip (R and L indicating the right and left legs), joints (axes) 12R, 12L for rotation at the hip in the pitch direction (rotation about the x axis), joints (axes) 14R, 14L for rotation at the hip in the roll direction (rotation about the y axis), joints (axes) 16R, 16L for rotation at the knee in the roll direction, Joints (axes) 18R, 18L for rotation at the ankle in the roll direction and joints (axes) 20R, 20L for rotation at the ankle in the pitch direction. Foot members 22, 22L are provided at the lower end of this arrangement and a body (main unit) 24 housing a control unit 26 is provided at the upper end. The hip joints in the foregoing configuration are constituted by the joints (axes) 10R(L), 12R(L) and 14R(L) and the ankle joints by the joints (axes) 18R(L) and 20R(L). The hip and knee joints are connected by thigh links 32R, 32L and the knee joints and ankle joints by crus links 34R, 34L.

The leg links of the respective legs thus have six degrees of freedom, so that during locomotion the legs as a whole can be caused to execute the desired motion by driving the $6 \times 2 = 12$ joints (axes) to appropriate angle. The robot is thus capable of walking freely within three dimensional space. The joints are provided mainly by electric motors, as was mentioned earlier, and reduction gear mechanism for increasing motor torque. The structure of the joints is described in the assignee's earlier Japanese Patent Application No. 1(1989)-324,218 (Japanese Laid-Open Patent Publication No. 3(1991)-184,782) etc., and since it is not essential aspect of the present invention, will not be explained further here.

The individual ankles of the robot 1 shown in FIG. 1 are provided with a six dimensional force and torque sensor 36 of conventional design. By measuring the x, y and z force components Fx, Fy and Fz transmitted to the robot through the foot members and also measuring the moment components Mx, My and Mz around the three axes, the six-dimensional force and torque sensor 36 detects whether or not the associated foot member has landed and the magnitude and direction of the forces acting on the supporting leg. The sole of each foot member is equipped at its four corners with touchdown switches 38, not illustrated in FIG. 1, of conventional design for detecting whether or not the foot is in contact with the ground. The top of the body 24 is provided with an inclination sensor 40 for detecting the robot's inclination angle and angular velocity relative to z axis in the x-z and y-z planes. Each electric motor at the individual joints is provided with a rotary encoder for generating rotational information. And, although not illustrated in FIG. 1, the robot 1 is provided with a zero reference switch 42 for calibrating the output of the inclination sensor 40 and a limit switch 44 for a fail safe. The outputs of the sensors 36 and the like are sent to the control unit 26 in the body.

Figure 2:
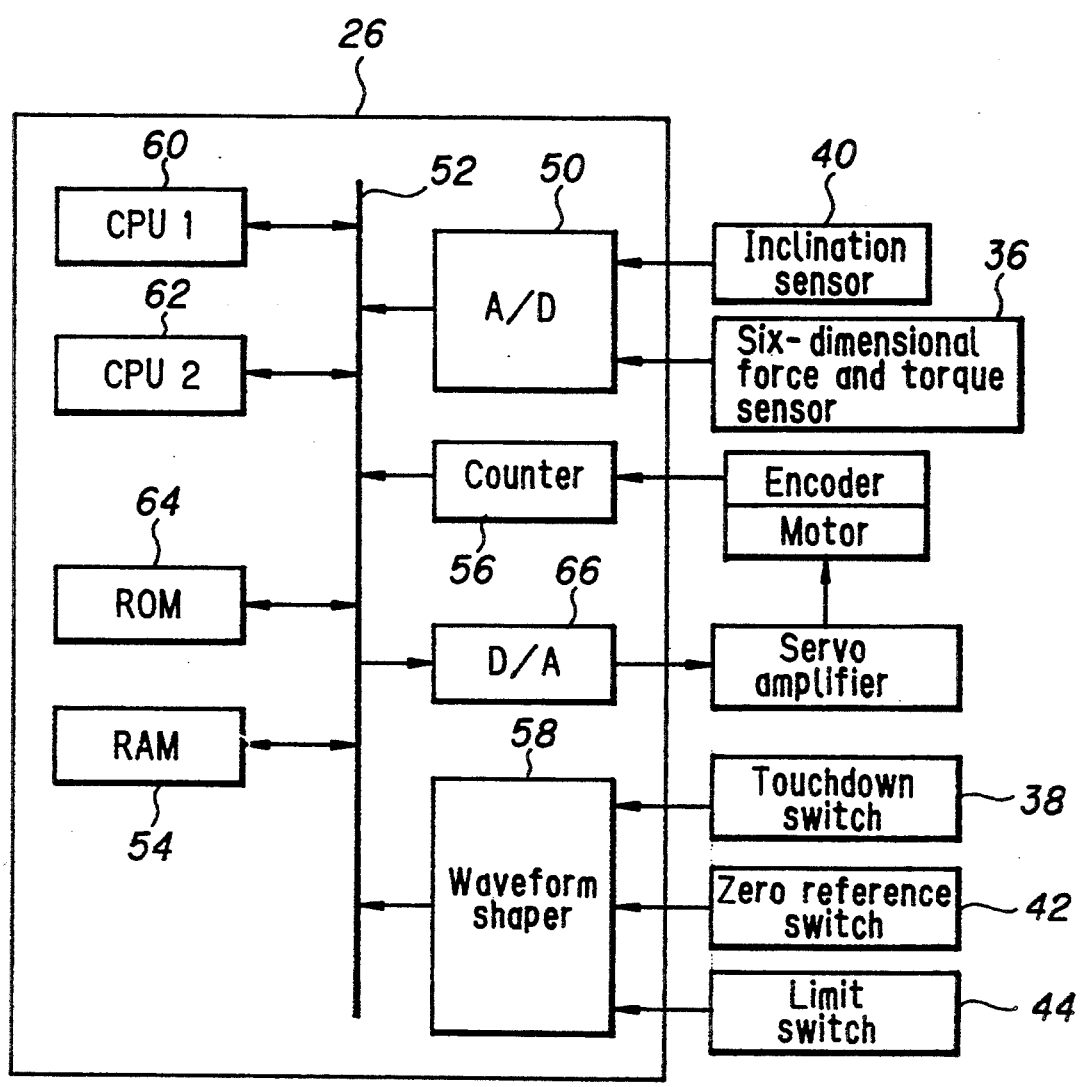
FIG. 2 is a block diagram showing the details of a control unit illustrated in FIG. 1.

As shown in the block diagram of FIG. 2, the control unit 26 has a microcomputer. The outputs from the inclination sensor 40 etc. are converted into digital signals by an A/D converter 50 and the resulting digital values are sent via a bus 52 to a RAM (random access memory) 54 for storage. In addition, the outputs of encoders disposed adjacent to the respective motors are input to the RAM 54 through a counter 56, while outputs of the touchdown switches 38 are stored in the RAM 54 via a waveform shaper 58. The control unit has a first processor 60 and a second processor 62. The first processor 60 fetches a walking pattern defined in advance in terms of joint trajectories from a ROM (read-only memory) 64, computes target joint angles (joint drive pattern) and outputs the same to the RAM 54. The second processor 62 fetches the target joints angles (displacement commands) and measured joint angles from the RAM 54, computes control commands of the individual joint motors and sends the same to a servo amplifier thereof via a D/A converter 66 as illustrated in FIG. 3.

Figure 3:
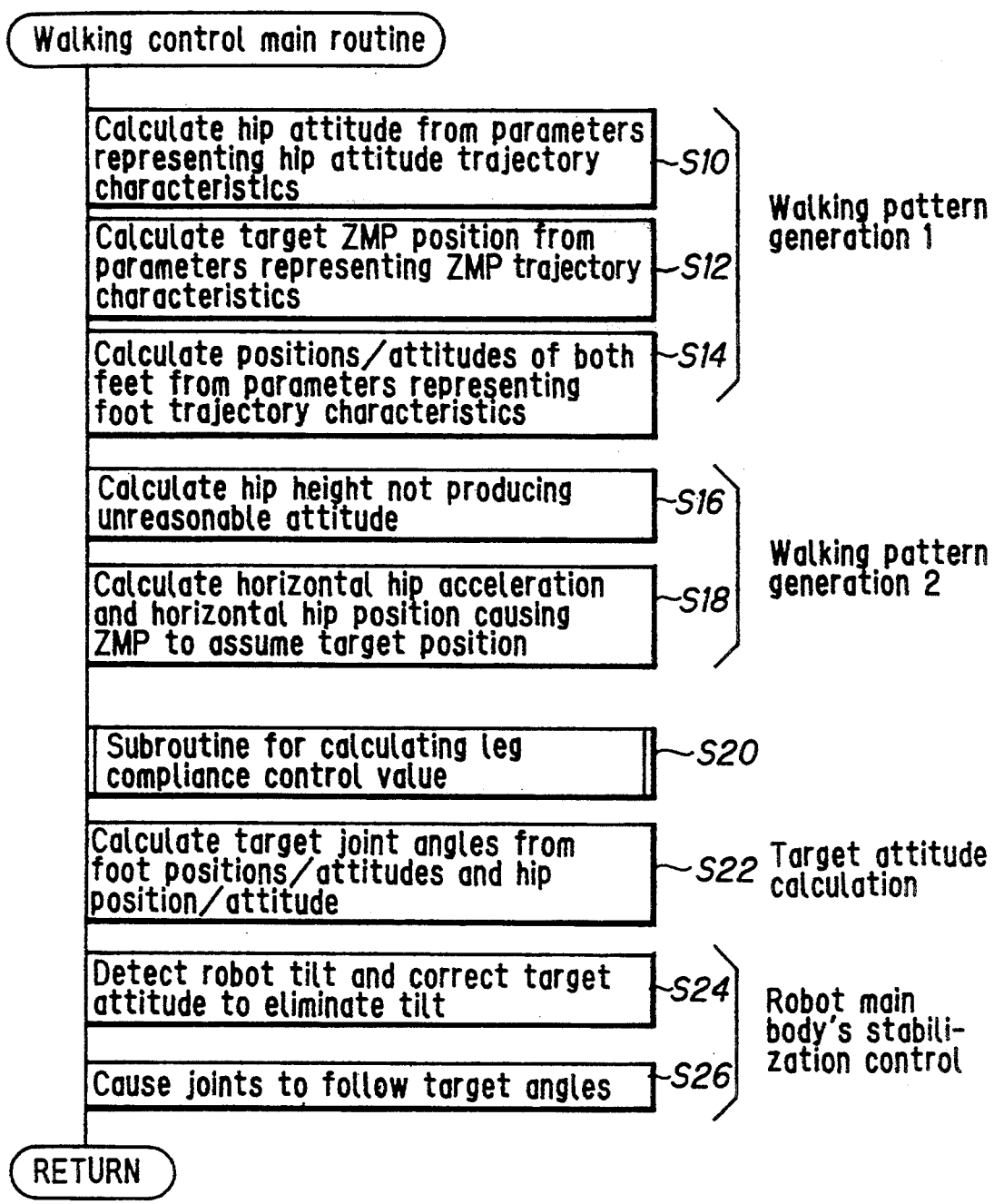
FIG. 3 is a flow chart showing the operation of the locomotion control system according to the invention.

FIG. 3 is a configurational flow chart (PAD diagram) of the operation. First, in step S10, the hip attitude (i.e. the hip tilt and orientation) is calculated from the parameters representing the position. Next, in step S12, the ZMP target position derivable from an equation of motion is calculated from the parameters representing the characteristics of the ZMP trajectory. (If the ZMP is represented by a broken line curve, the parameters representing the characteristics are also given as joint coordinates. Here, the term ZMP (Zero Moment Point) is the ground point at which the horizontal moment Mx, My produced by the ground reaction force is zero.) Control then passes to step S14 in which the positions and attitudes of both feet are calculated from the parameters representing the foot trajectories (e.g. the footfall position and the length of the one-leg support period), to step S16 in which the hip height is determined, and to step S18 in which the hip's horizontal (displacement) acceleration and horizontal position are determined. Steps S10 to S18 are thus operations for generating the basic walking pattern. As was explained earlier, in the present embodiment the parameters representing the trajectory of the hip attitude and the like are predefined as data for each walking step and the basic walking pattern is obtained by calculating the trajectories of the hip, ZMP, and foot positions/attitudes from this data. As will be explained later, the specific target angles for the respective joints are calculated from the basic walking pattern.

Figure 4:
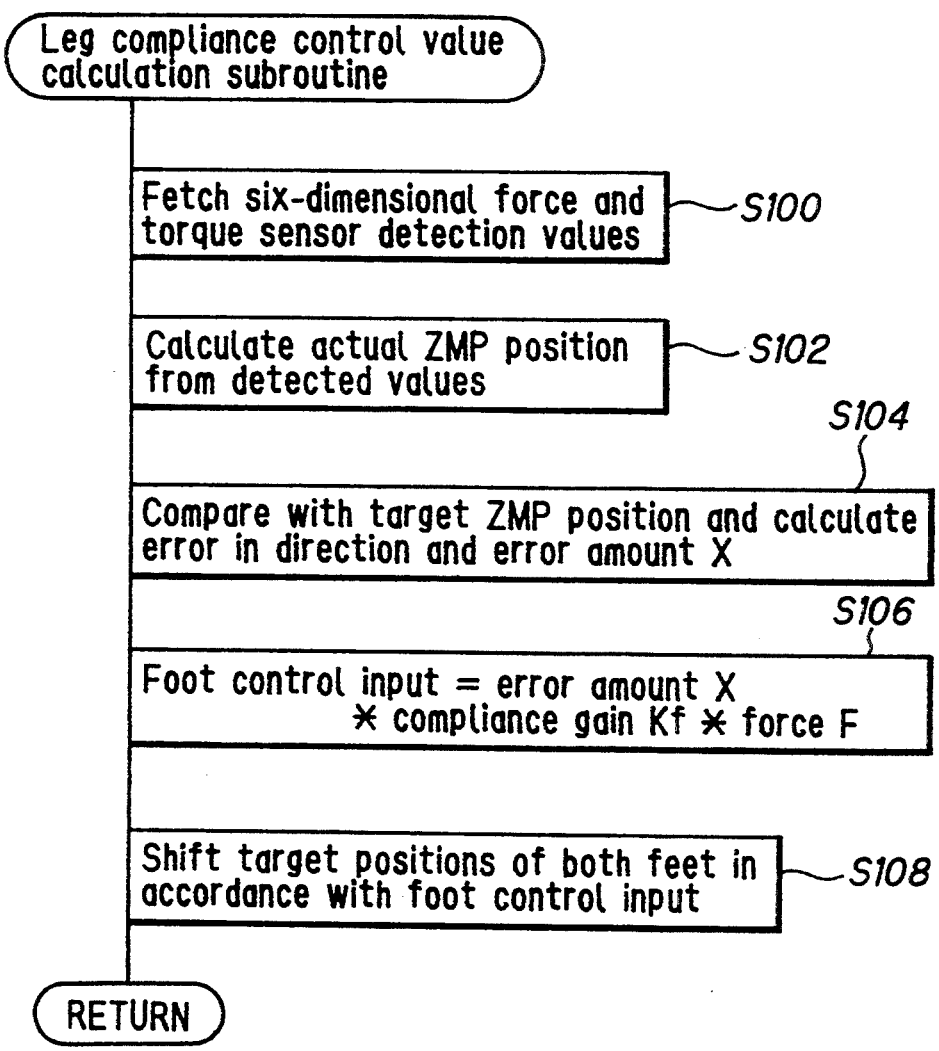
FIG. 4 is a flow chart showing a subroutine for calculating leg compliance control value.

Control then passes to step S20 in which a leg compliance control value computation is conducted. The subroutine for this is shown in FIG. 4.

Figure 5:
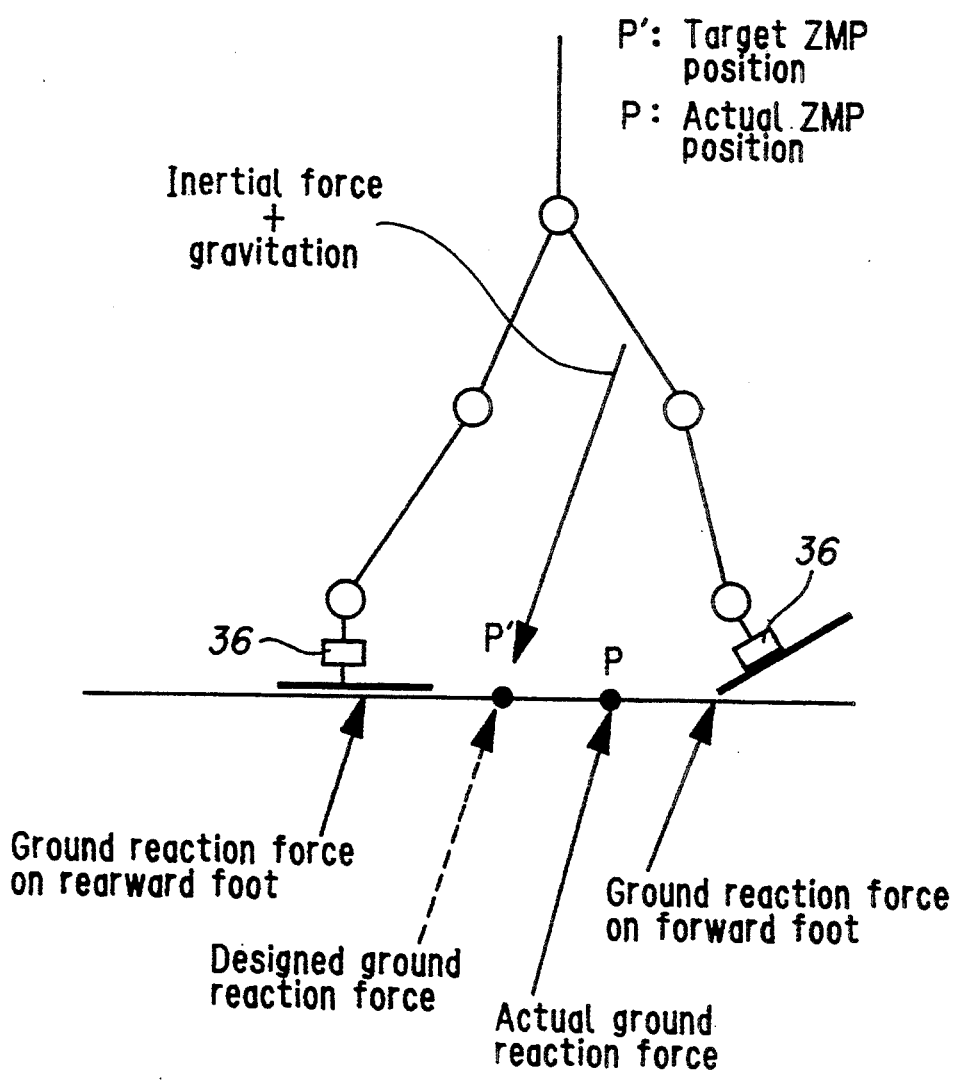
FIG. 5 is a view explaining the leg compliance control of FIG. 4.

Before going into FIG. 4, an explanation of leg compliance control will be made with reference to FIG. 5.

As was explained earlier, a robot is able to walk stably if the force it exerts on the ground (the resultant of the robot's weight and inertial force) is in equilibrium with the reaction force of the ground on the robot. Viewed in terms of a concentrated force system, this means that the robot is able to walk while maintaining the designed attitude provided that the actual ZMP position (center of the ground reaction force actually detected) coincides with the target ZMP position (center of the ground reaction force assumed by the designed values). In the first embodiment of the invention, therefore, the ground reaction forces acting on the rearward foot and the forward foot are detected from the outputs of the six-dimensional force and torque sensors mounted on the legs, the total actual ground reaction force is calculated as the resultant of the two detected forces, and the actual ZMP position (the point of application of the resultant) is determined and compared with the target ZMP position. If, as shown in FIG. 6A, the actual ZMP position P of the actual ground reaction force AGRF is shifted forward of the designed ground reaction force (in which case, the robot tilts backward owing to the moment produced about the target ZMP position P' of the designed ground reaction force DGRF), the forward foot is raised vertically in proportion to the amount of shift, as shown in FIG. 6B at arrow RFFV, (or the rearward foot is lowered vertically in proportion to the amount of shift) or the forward foot is raised and the rearward foot lowered vertically in proportion to the amount of shift, as shown in FIG. 6C at arrows RFFV and LRF, respectively. Since this causes the ground reaction force acting on the forward foot to decrease relative to the ground reaction force acting on the rearward foot, the actual ZMP position moves rearward to approach the target ZMP position. This control is referred to as "leg compliance control" in this specification. That is to say, the term "leg compliance control" is used in this specification to mean control for eliminating error (deviation) between the target and actual ZMP positions or control for eliminating any moment which tends to be produced about the target ZMP position.

Figure 7:
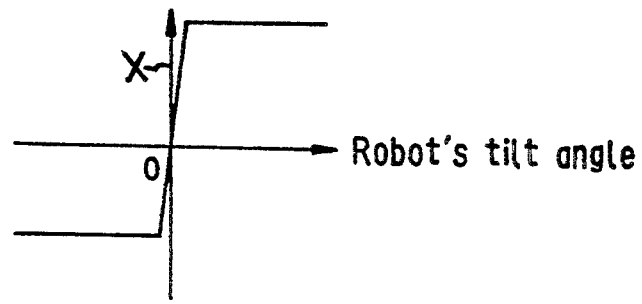
FIG. 7 is a graph showing a relationship between an error amount X between an actual ZMP position and a target ZMP position and robot's tilt angle when the leg compliance control referred to in the flow chart of FIG. 4 is not conducted.
Figure 8:
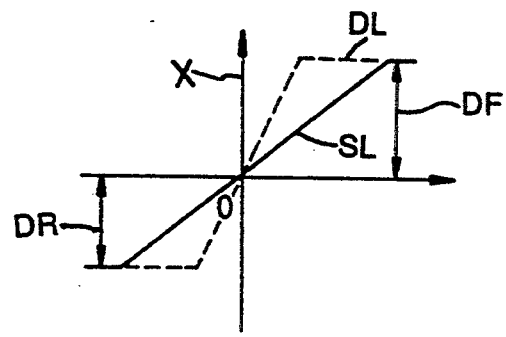
FIG. 8 is a graph, similar to FIG. 7, but showing a relationship between the error and the angle when the leg compliance control is conducted and illustrating the case wherein a value of the leg compliance control is small in contrast with the case wherein a value of the leg compliance control is large.

Assume that in the course of walking in accordance with an ideal walking pattern based on dynamic computations the robot encounters an unexpected terrain irregularity during a two-leg support period. If the leg compliance control discussed in this specification should not be conducted, the robot's rearward foot would rise off the ground. Since this would cause the entire load to act on the forward foot, the point of application of the ground reaction force (the actual ZMP position) would shift to the sole of the forward foot. In other words, the ZMP position would change in a substantially binary manner with respect to the robot's inclination, as shown in FIG. 7 for an error amount X (FIG. 6D) between actual ZMP position P and target ZMP position P' with no leg compliance control. On the other hand, when leg compliance control is conducted, if the actually detected center of the ground reaction force (actual ZMP position P) shifts forwarded of the center of the ground reaction force (designed target ZMP position P'), the forward foot is raised to cause the robot to assume an attitude with both feet on the ground but with the upper body still tilted forward. At this time, since the error between the actual ZMP position and the target ZMP position at this time is proportional to the height by which the foot is raised and the height by which the foot is raised is proportional to the tilt angle of the upper body, a proportional relationship exists between the upper body tilt angle and the error between the actual and target ZMP positions. As will be explained later, the proportionality gradient is inversely proportional to the magnitude of the leg compliance so that the region of proportionality with respect to the robot's tilt angle increases as the amount of leg compliance becomes larger (FIG. 8).

Figure 9:
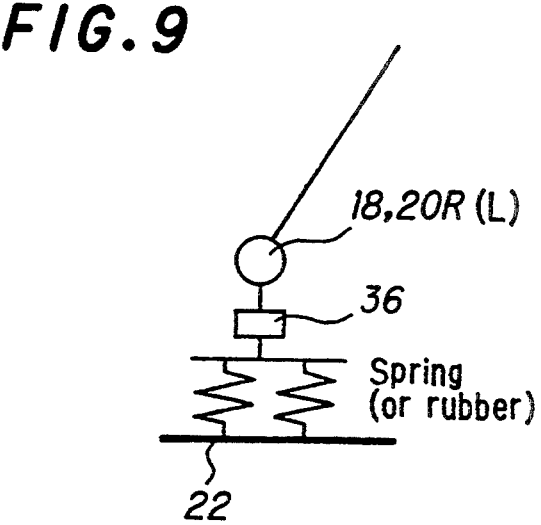
FIG. 9 is a view showing a robot foot model having a structure suitable for the leg compliance control of FIG. 4.

It should be noted that the leg compliance control need not be limited to the two-leg support periods but can also be conducted during one-leg support periods. In addition, for preventing leg compliance control oscillation and mechanically absorbing high-frequency components of the load fluctuation, it is preferable to insert impact absorption mechanisms formed of rubber or the like under the ankle joints 18, 20R (L), as shown in FIG. 9.

Figure 10:
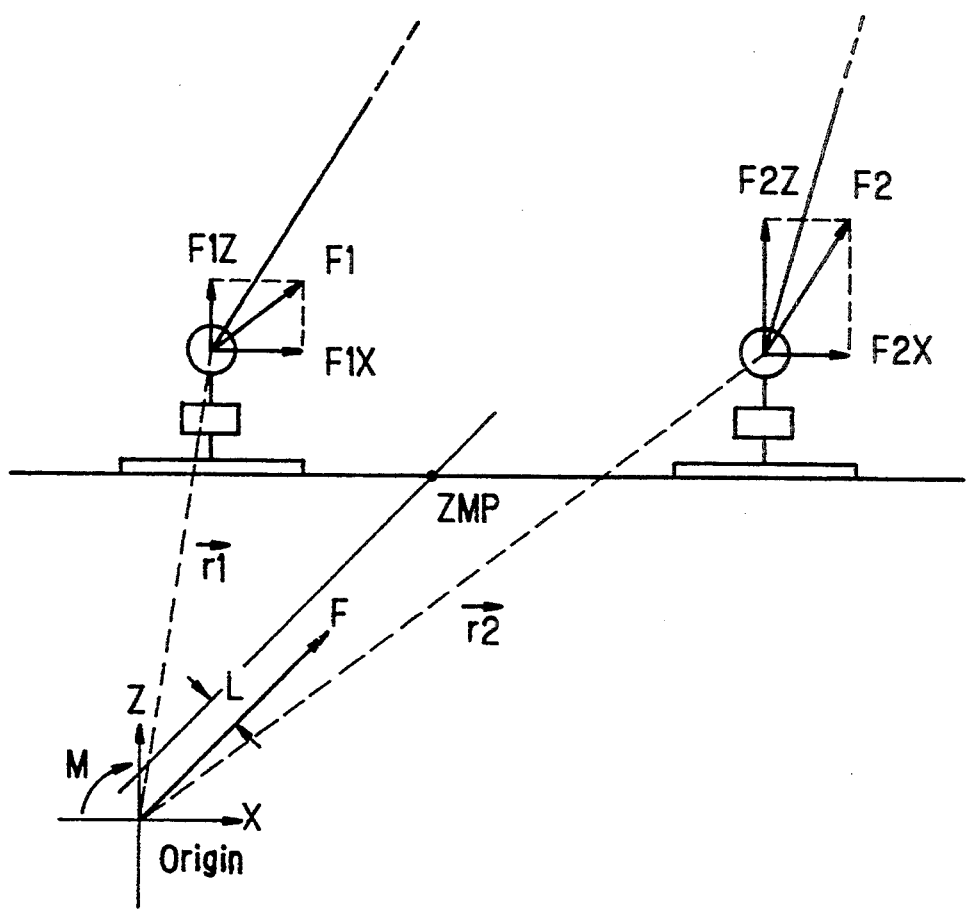
FIG. 10 is a view explaining the calculation of the actual ZMP position referred to in the flow chart of FIG. 4.

The processing used to achieve the leg compliance control will now be explained with reference to FIG. 4. First, in step S100, the detection values of the six-dimensional force and torque sensors 36 are read. Control then passes to step S102 in which the actual ZMP position is calculated. The method for this is shown in FIG. 10. The moment $\vec{M}$ about an arbitrary origin is calculated, $\vec{F}$ is calculated, the distance vector $\vec{L}$ satisfying $\vec{M} = \vec{F} \times \vec{L}$ is calculated, the force $\vec{F}$ is translated parallel to itself by the distance L, and the point of intersection between the force $\vec{F}$ and the ground is determined.

Control then passes to step S104 in which the actual ZMP position and the target ZMP position are compared, a discrimination is made as to whether any error of the actual ZMP position from the target ZMP position is to the fore or to the rear, and the difference (amount of error) X is calculated in terms of distance. Control then passes to step S106 in which the calculated error amount X is multiplied by a prescribed gain Kf and the actual ground reaction force F (or the vertical (z-direction) component Fz thereof) to obtain a foot attitude correction amount (a method which does not involve multiplication by the ground reaction force can also be used). In other words, as was explained earlier, if the actual ZMP position is shifted forward of the target ZMP position the moment produced about the center of the ground reaction force according to the designed target ZMP position causes the robot to tilt backward as shown in FIGS. 6A–D. Therefore, in step S106, a foot attitude correction amount is calculated for causing the forward foot to be lifted vertically, the rearward foot to be lowered vertically or the forward foot to be lifted vertically and the rearward to be simultaneously lowered vertically and in step S108 the foot position/positions is/are corrected on the basis of the foot attitude correction amount, thus producing a moment in the opposite direction. Since this moves the actual ZMP position closer to the target ZMP position, a balanced attitude is restored and the robot is able to walk while maintaining the attitude specified by the design. Referring to FIG. 8, the solid line SL represents the relationship when the leg compliance control value is large and the dashed line DL represents the relationship when the leg compliance control value is small. The arrow DF represents the distance between the forward foot and the target ZMP position P' and the arrow DR represents the distance between the rearward foot and the target ZMP position P'. As shown in FIG. 8, the attitude correction amount (height by which the foot is raised) is decided with reference to the error amount X, and since the error amount X is proportional to the upper body tilt angle, the attitude correction amount is proportional to the upper body's tilt angle. In other words, if the robot attitude restoration force coefficient is defined as the ratio of the robot attitude restoration force and the upper body's tilt angle, then by deciding the attitude correction amount with reference to the upper body tilt angle it becomes possible to maintain the robot attitude restoration force coefficient at a fixed value to the utmost possible. That is to say, the robot can be simulated as an inverted pendulum that constantly maintains a fixed restoration force coefficient, which makes it possible to obtain linear control characteristics. As for the direction of the attitude correction, if the actual ZMP shifts rearward of the designed ZMP so that a forward directed moment acts on the robot, the foot/feet is/are driven in the opposite direction/directions, namely, the rearward foot is raised, the forward foot is lowered, or both of the foregoing are conducted.

Control then passes to step S22 for the flow chart of FIG. 3, in which the target angles for all twelve joints are calculated from the foot positions/attitudes and the hip position/attitude. If, in the calculation of the leg compliance control value in step S20, the foot attitude is corrected by the operation mentioned in the flow chart of FIG. 4, the target angles are calculated on the basis of the corrected attitude. Control then passes to step S24 in which the robot's tilt is detected from the output of the inclination sensor 40 and if the robot is tilted, the target attitude is corrected for restoring the proper attitude. (This correction is not directly related to the invented control and will not be explained further.) Control then passes to step S26 in which the joints are controlled to follow the target angles. This control, which is conducted in the second processor 62 shown in FIG. 2, is also not related to the purport of the invention and will not be explained further.

Being configured in the foregoing manner, the present invention effectively eliminates any error that may arise between the actual ZMP position and the target ZMP position owing to unexpected terrain, thus canceling out any moment arising around the target ZMP position and tending to cause the robot to tip over. Specifically, since the robot can be simulated as an inverted pendulum that constantly maintains a prescribed restoration force, the control characteristics become linear, making it easier to design the control system. The linear control characteristics also make it possible to combine the control with other types of attitude stabilization control and to achieve stable walking even over terrain with unexpected irregularities. Moreover, since the actual ZMP position and the target ZMP position can be made to coincide, the footfall impact is reduced ("footfall impact" being defined as an especially large ground force reaction occurring when a foot touches down).

Figure 11:
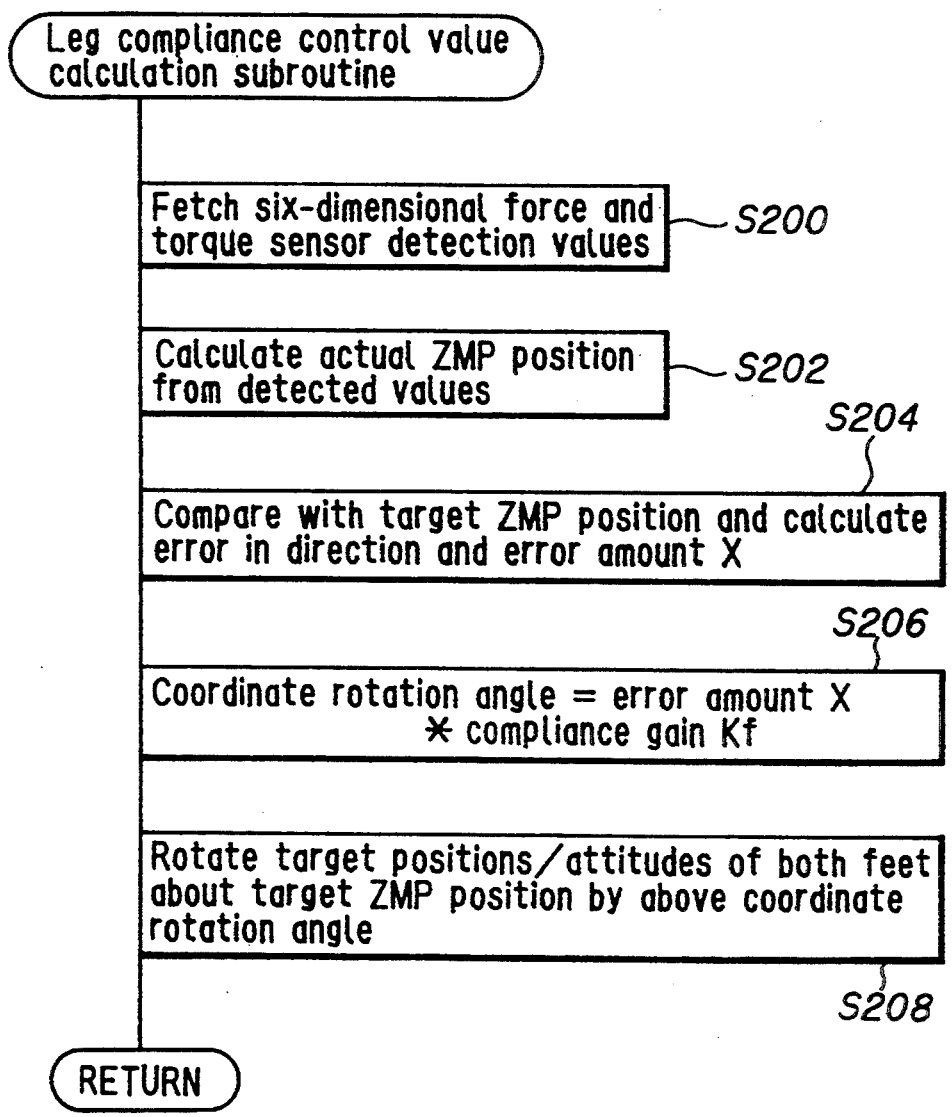
FIG. 11 is a flow chart, similar to FIG. 4, but showing a subroutine for calculating leg compliance control value according to a second embodiment of the invention.

A second embodiment of the invention is shown in FIG. 11, which is another leg compliance control value calculation subroutine similar to that of FIG. 4. The explanation of this embodiment will focus on how it differs from the first embodiment. After the direction in error and the amount of error X have been determined (steps S200–S204), control passes to step S206 in which, as shown in of FIG. 6D, the coordinate rotation angle Θ is calculated in the illustrated manner for the case where it is assumed that the relationship between the ground and the feet is maintained constant but the ground is inclined. Control then passes to step S208 in which the attitude is corrected to rotate the positions/attitudes of both feet around the target ZMP position by the aforesaid angle. The ground inclination angle θ is defined as $\theta$ = error amount X · gain Kf(Compliance constant).

As shown in FIG. 6D, in the case of this embodiment, when the actual ZMP shifts forward, the rearward foot kicks strongly against the actual ground (indicated by a solid line) to produce a ground reaction force, thus moving the actual ZMP position P closer to the target ZMP position P'. In other words, in this case, too, a moment can be produced in the opposite direction thereto, whereby attitude disruption can be prevented. As also shown in FIG. 6D, the virtual ground rotation is aligned with the target ZMP position P' on the virtually inclined ground while maintaining the relationship between the ground and the feet constant. As in the first embodiment, the restoration force is again imparted in proportion to the amount of error. In other words, it is possible to maintain the restoration force coefficient constant and obtain linear control characteristics.

Figure 12:
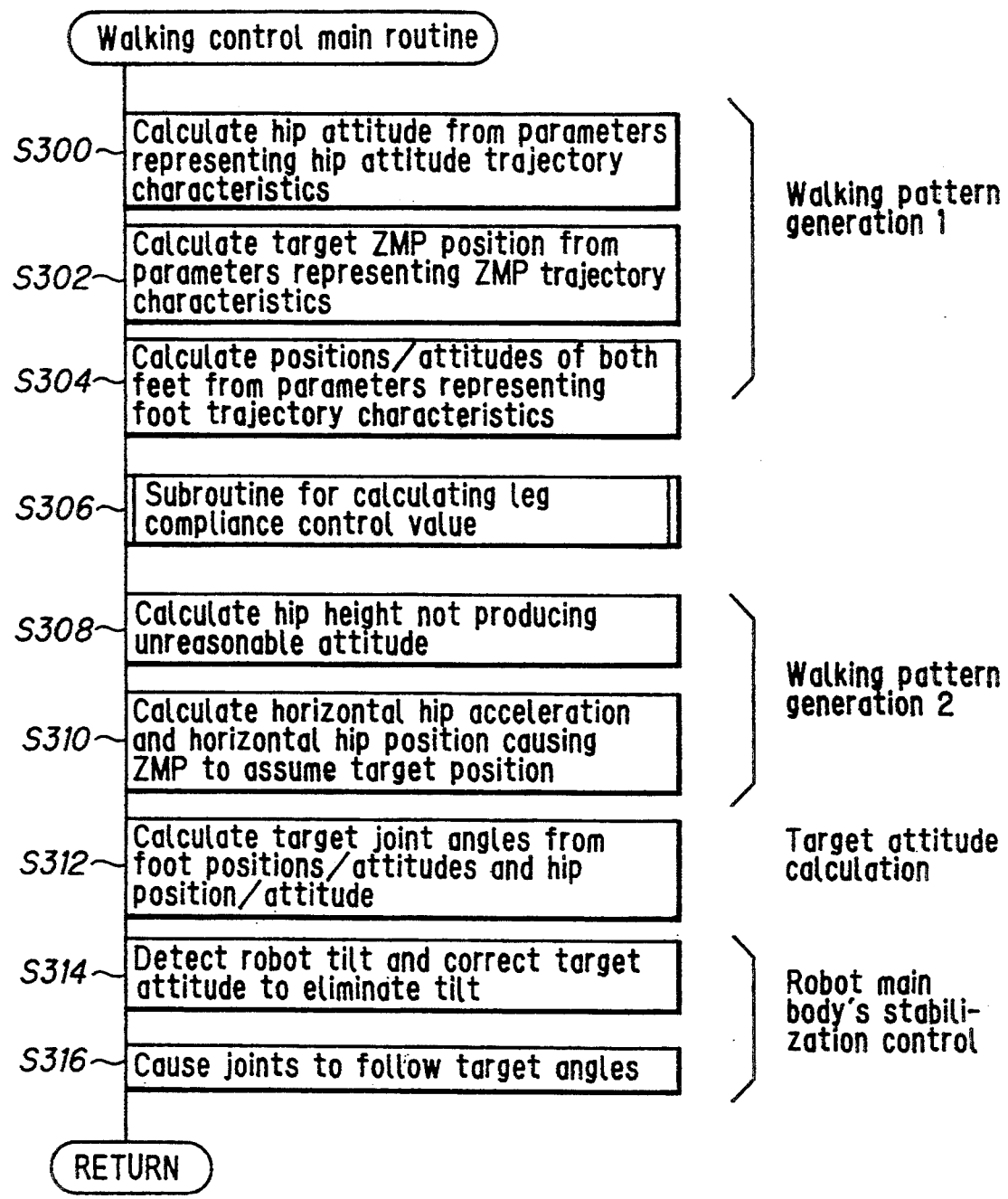
FIG. 12 is a flow chart, similar to FIG. 3, but showing the operation of a locomotion control system according to a third embodiment of the invention.

A third embodiment of the invention is shown in FIG. 12, which is a flow chart similar to that in FIG. 3. The explanation of this embodiment will also focus on how it differs from the first and second embodiments. In this embodiment, after the leg compliance control value has been calculated in steps S300–S306, control passes to step S308 in which the vertical (z-direction) hip height not producing an unreasonable attitude is calculated, to step S310 in which the hip horizontal (displacement) acceleration and horizontal position is calculated such that the ZMP will assume the target position even if the foot positions/attitudes are corrected based on the leg compliance control, and to step S312 in which the target joint angles are calculated on the basis of the foot positions/attitudes and the hip position/attitude (the corrected values if corrected in step S306 of this subroutine). The remaining steps S314 and S316 of this embodiment are the same as those in the first and second embodiments.

Since the main purpose of the leg compliance control is to ensure that the actual ZMP position does not shift from the target ZMP position even when the robot is subject to disturbances from terrain irregularities or inclinations, it is preferable for the target ZMP position itself not to change even when the leg compliance control is conducted. While it is possible to return the actual ZMP position to the target ZMP position only by using the leg compliance control to correct the positions of the feet, this may result in a change in the attitude of the upper body and cause the target ZMP position itself to deviate from the desired position. However, if the mass of the legs, particularly the mass of the leg extremities, is sufficiently small in comparison with the mass of the upper body, the error of the designed (target) ZMP position can be ignored, in which case the horizontal position of the upper body according to the basic walking pattern suffices. Although the mass of the feet 22 of the robot configuration shown in FIG. 1 is not particularly small, it was nevertheless ignored in the first and second embodiments on the assumption that the effect of the leg compliance control on the upper body is extremely small. In contrast, the third embodiment corrects the horizontal position and displacement acceleration of the upper body as illustrated. Therefore, in addition to the effects of the first (or second) embodiment, there is obtained an effect enabling even more precise attitude stabilization. (Step S308 for correcting the vertical height of the hip need not be executed in the third embodiment.)

If the motion in the leg compliance control is small, the subroutine for calculating the leg compliance control value can be moved to a point in the course of or after the walking pattern generation 2. When this is done, it becomes possible to have the processing conducted by the walking pattern generation 1 and the walking pattern generation 2 conducted off line, which is advantageous in cases where a low performance computer is used.

Figure 13:
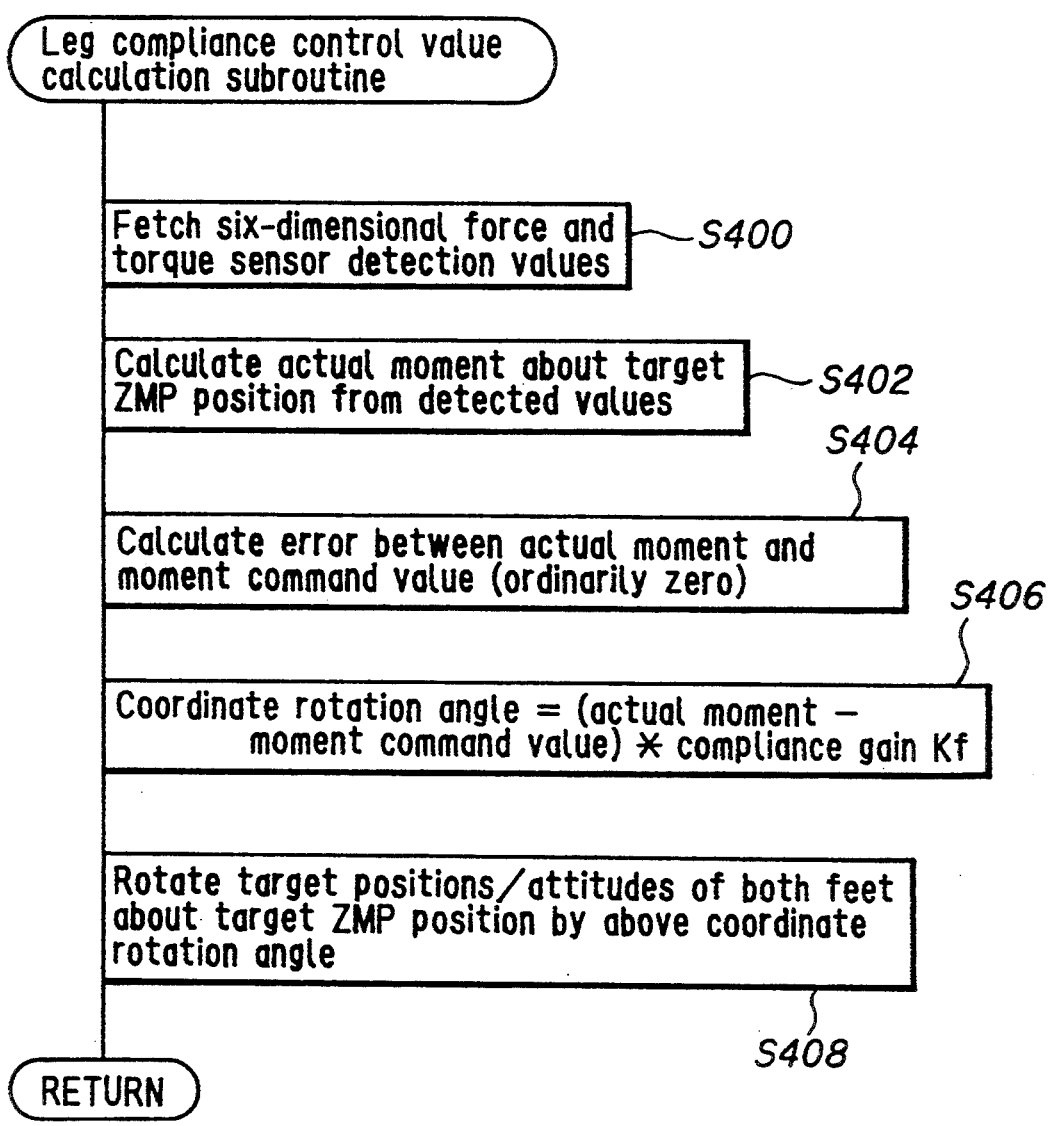
FIG. 13 is a flow chart, similar to FIG. 4, but showing a subroutine for calculating leg compliance control value according to a fourth embodiment of the invention.

A fourth embodiment of the invention is shown in FIG. 13, which, like FIG. 4 (first embodiment) and FIG. 11 (second embodiment), is a subroutine for calculating the leg compliance control value. After the detection values of the six dimensional force and torque sensors have been fetched in step S400, control passes to step S402 in which the actual moment produced around the target ZMP position is determined, to step S404 in which the difference (the amount of error) between the actual moment and the moment command (ordinarily set to zero) is determined, and to steps 406 and 408 in which, as in the second embodiment, the error is multiplied by a gain to obtain the coordinate rotation angle and the position/attitude correction amounts for both feet are calculated from the coordinate rotation angle.

The fourth embodiment differs from the earlier embodiments in the manner of resolving the detected ground reaction force. To be specific, the earlier embodiments focus on the position of the point of application when the ground force reaction is resolved as only a force vector without any moment. In contrast, the fourth embodiment focuses on the moment when the value acting on the target ZMP position is resolved into a force and a moment. It does thus not differ fundamentally in detection method from the earlier embodiments.

In the fourth embodiment, the target joint angles are calculated after the leg compliance control value has been calculated in accordance with the subroutine of FIG. 13. At this time, it is possible not to conduct a correction of the position/attitude of the upper body of the type conducted by the first embodiment and indicated in FIG. 3. On the other hand, it is possible to conduct a correction of the position/acceleration of the upper body in the horizontal direction as in the third embodiment of FIG. 12. Since the fourth embodiment decides the leg compliance control value on the basis of the directly detected moment around the target ZMP position, it can achieve stable attitude control even more linearly than the earlier embodiments.

The fourth embodiment will further be explained with reference to the block diagram of FIG. 14 for the case of a flat terrain walking pattern (the ensuing explanation also applies to a case in which the basic walking pattern is that for a sloped terrain of grade $\theta 1$, provided that delta $\theta$ and delta $\theta$comm are replaced by $\theta 1 +$ delta $\theta$ and $\theta 1 +$ delta $\theta$comm). As shown in the figure, the system has an inverse kinematic processor for calculating the displacements of the respective angles from the predefined position/attitude. This processor calculates the attitude in the basic walking pattern for the case where the ground is inclined by delta $\theta$comm. A displacement controller controls the displacements of the joints of the robot shown in FIG. 1 so as to follow the attitude commands output by the inverse kinematic processor. In the attitude obtained by the actual joint displacements, the relative angle between the robot and the foot ground contact line (line AA' in the figure) is defined as delta $\theta$, where the robot of FIG. 1 is assumed to be perfectly rigid. If the displacement controller has adequate follow-up characteristics, delta $\theta$ will coincide with delta $\theta$comm. At this time the transfer function G from the relative angle between the robot and the ground to the actual ground reaction force moment M around the ZMP target position becomes $$G = \frac{1}{1/K\text{leg} + Kf} \qquad \text{Equation 1}$$

Figure 15:
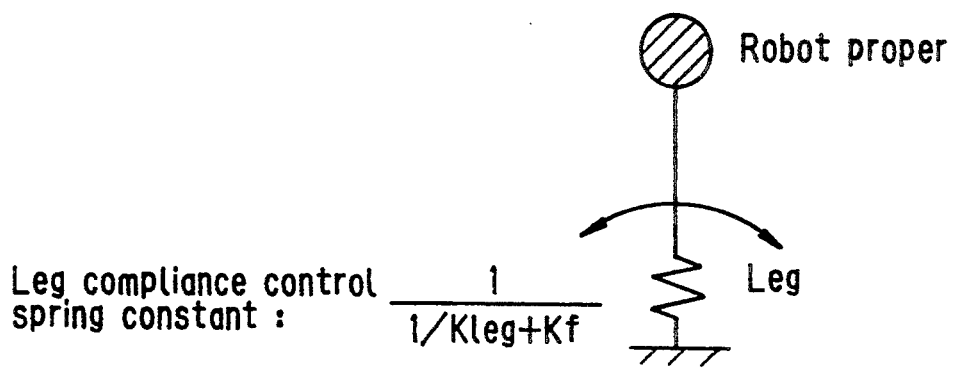
FIG. 15 is a view illustrating a model shown in the block diagram of FIG. 14.

As shown in FIG. 15, this is equivalent to a flexural spring with a spring constant of $1/(1/K\text{leg}+Kf)$.

In the fourth embodiment, when the robot treads on an unexpected bump or depression, the resulting moment around the target ZMP position is directly detected, a coordinate rotation angle proportional to the magnitude of the detected moment is calculated as a virtual value, and the position and attitude of the feet are corrected by rotation about the target ZMP position by the amount of the virtual angle. In other words, the moment about the target ZMP position is directly detected and a moment is produced in the opposite direction about the same position so as to cancel the detected moment. Therefore, as was mentioned earlier, there can be achieved more linear control characteristics and better attitude stabilization control than in the case of the first to third embodiments. Further, when horizontal position/attitude correction is additionally conducted in the manner of FIG. 12, even more appropriate control characteristic linearization and attitude stabilization can be realized.

Here, the target ZMP position moves continuously or discontinuously. Therefore, in the case of walking in which the target ZMP position moves suddenly, if the target ZMP position is defined as the center for the calculation of the moment or the center of rotation for the motion of the leg compliance control, the likelihood of the occurrence of abrupt behavior changes increases and the robot may start bounding or otherwise become incapable of stable walking. When such walking circumstances arise, this problem can be avoided by setting the center for the calculation of the moment or the center of the rotation of the motion of the leg compliance control at a point that enables more moderate movement or, for example, at a point obtained by smoothing the target ZMP position with a filter.

Figure 16:
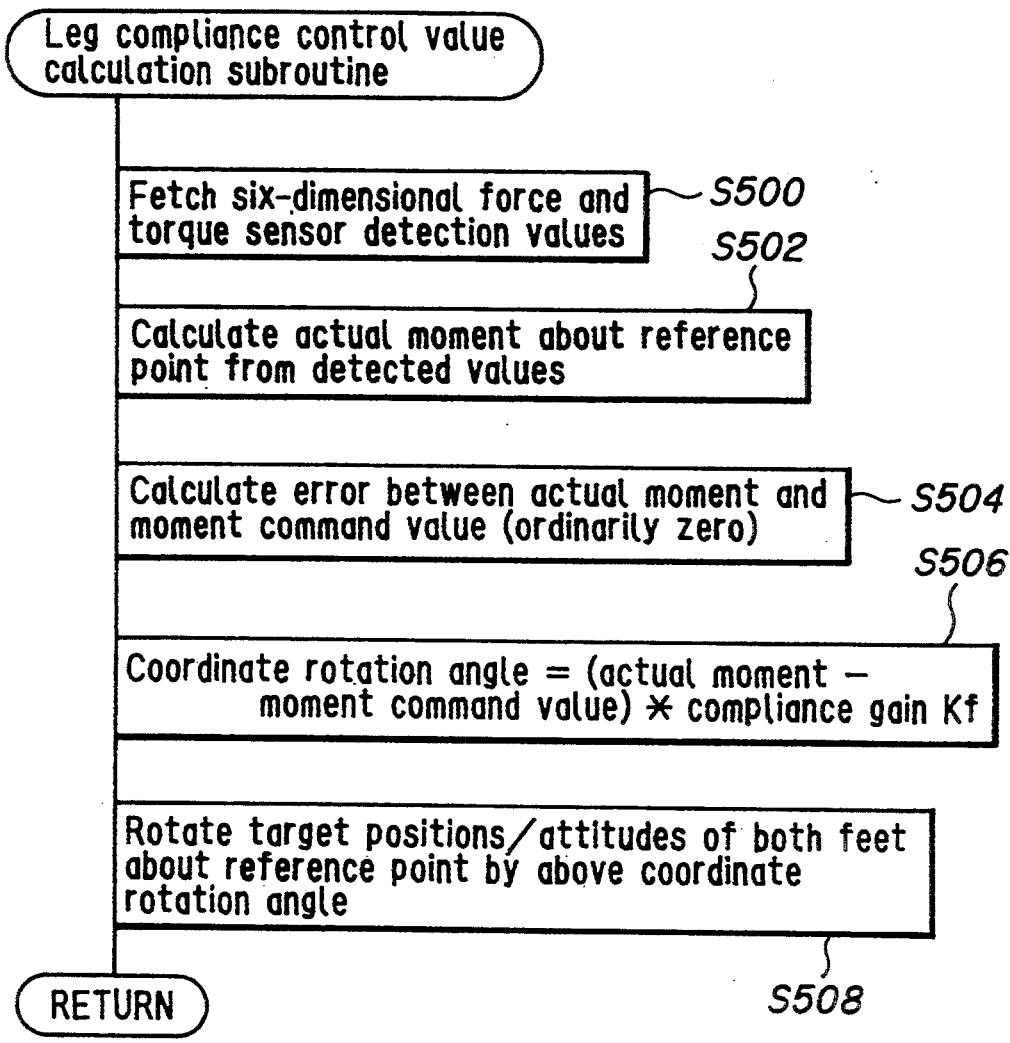
FIG. 16 is a flow chart, similar to FIG. 4, but showing a subroutine for calculating leg compliance control value according to a fifth embodiment of the invention.

A fifth embodiment of the invention is shown in FIG. 16, which, like FIG. 13 relating to the fourth embodiment, is a subroutine for calculating the leg compliance control value. The difference visa vis the fourth embodiment is that the moment is calculated not about the target ZMP position but about a reference point, e.g. about the point of projection on the ground of the ankle pivot point (the point of intersection between the joints 18, 20R (L) in FIG. 1), and the rotation is made about this point (steps S502, S508). The remaining steps are the same as those of the fourth embodiment. Also as in the fourth embodiment, whether or not upper body correction is conducted is optional. Aside from the fact that the ground reaction force moment can be calculated somewhat more easily and the control value is slightly inferior, the effect of the fifth embodiment is substantially the same as that of the fourth embodiment.

Figure 17:
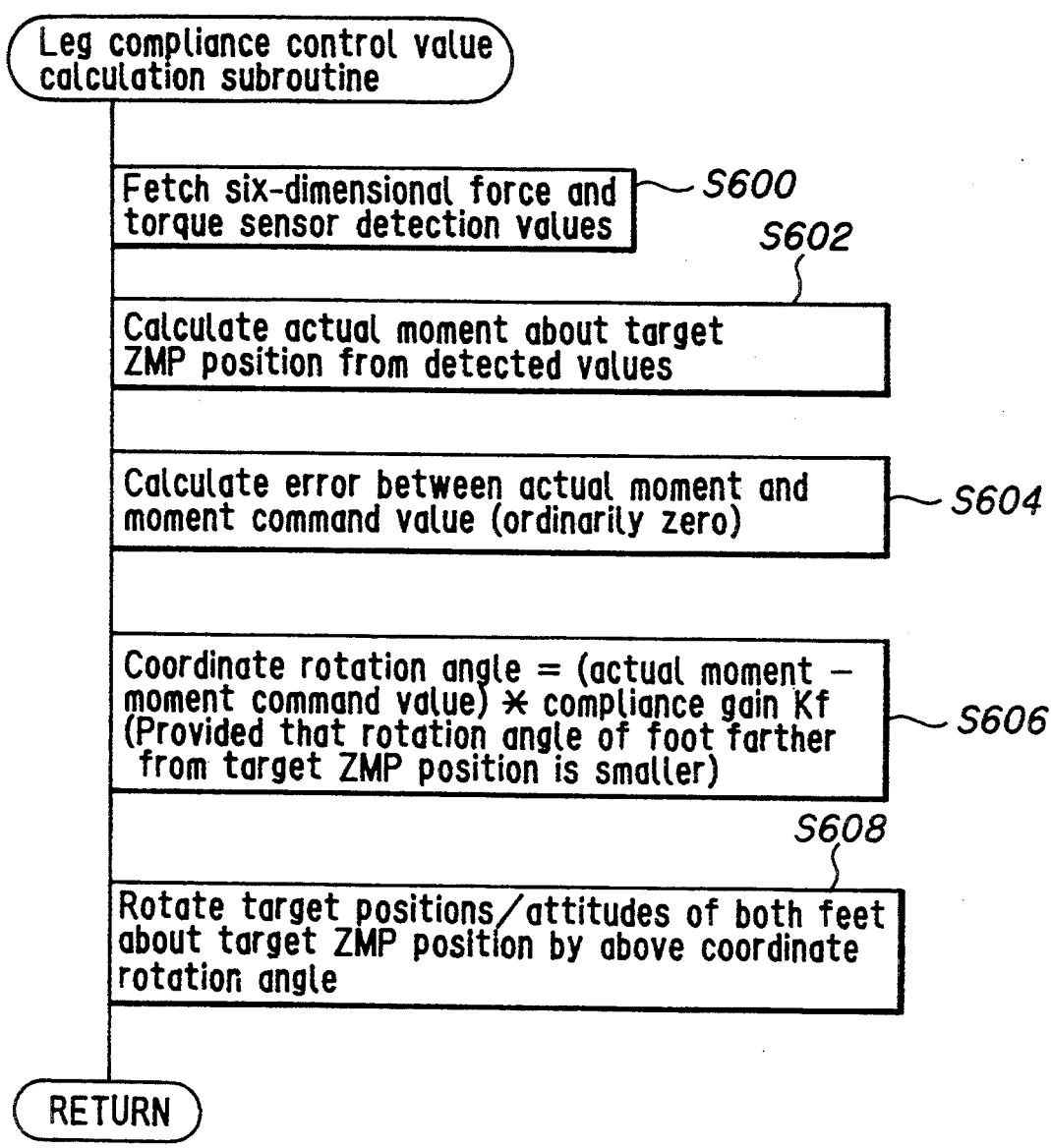
FIG. 17 is a flow chart, similar to FIG. 4, but showing a subroutine for calculating leg compliance control value according to a sixth embodiment of the invention.
Figure 18:
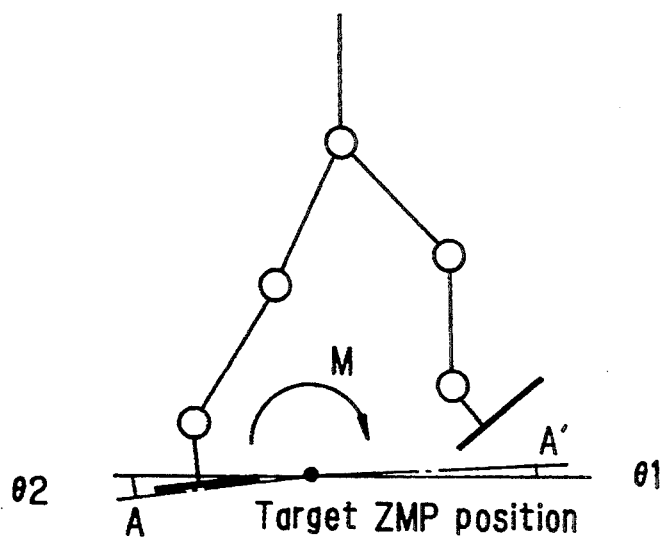
FIG. 18 is a view explaining the operation of the sixth embodiment of the invention.

FIG. 17 shows a sixth embodiment which differs from the earlier embodiments in that for coping with the problem that leg oscillation may occur when the leg more distant from the target ZMP position is moved vigorously, it makes the coordinate rotation angle $\theta 1$ of the more distant foot smaller than the coordinate rotation angle $\theta 2$ of the nearer foot (see FIG. 18). While the sixth embodiment uses the foot drive method of FIG. 2, it is also appropriate for the vertical movement of the first embodiment. It can be realized with or without upper body correction.

Figure 19:
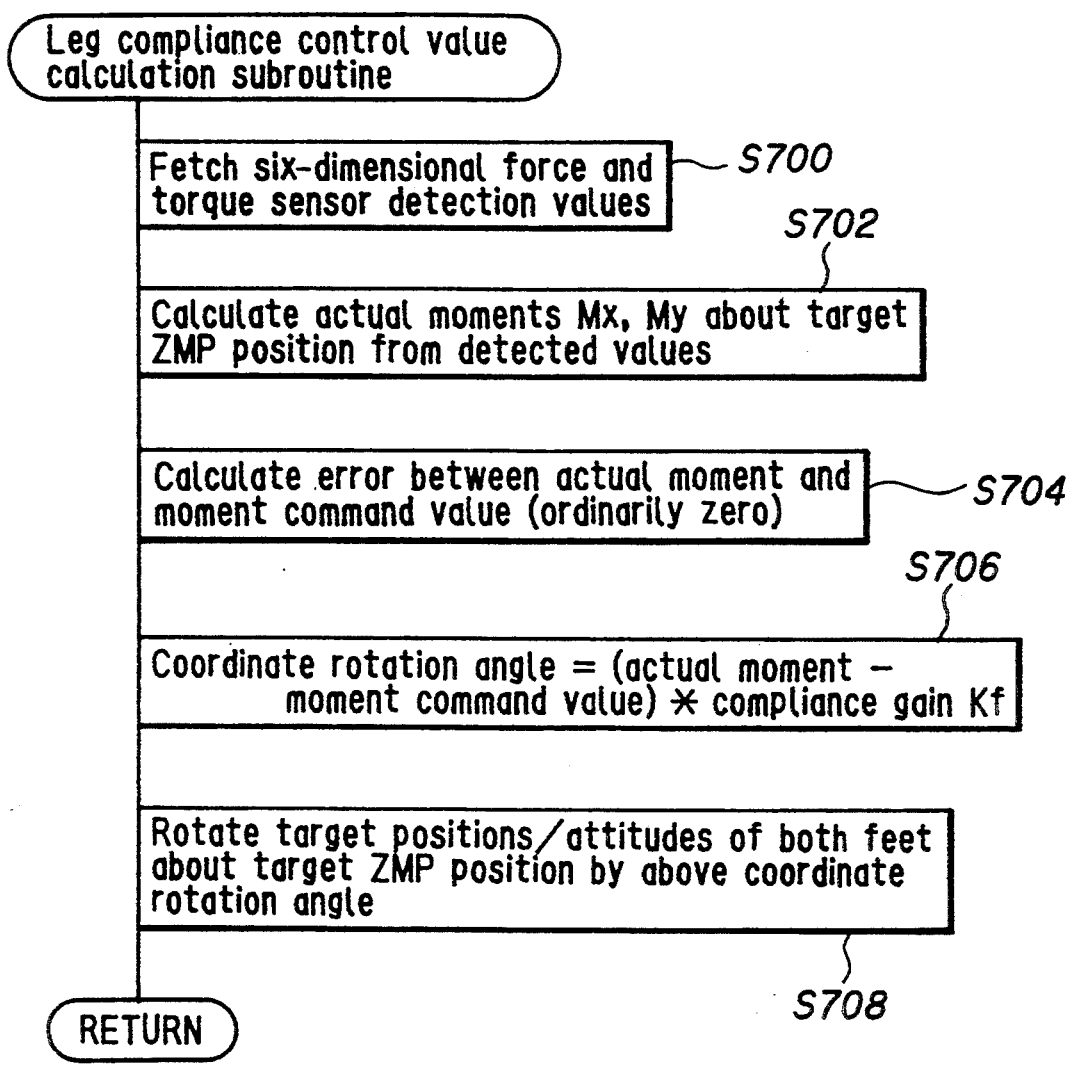
FIG. 19 is a flow chart, showing a subroutine for calculating leg compliance control value according to a seventh embodiment of the invention.

FIG. 19 shows a seventh embodiment which is designed to counteract lateral forces (with respect to the direction of advance) which tend to tip the robot over. Differently from the earlier embodiments which calculate a control value on the basis of the detected moment My acting about the y axis, the seventh embodiment calculates a control value on the basis of the detected moment Mx in the lateral direction (about the x axis) (steps S700–S708). Although the foregoing explanation is based on the second embodiment, the method of the seventh embodiment is also appropriate for use in the other embodiments. While the lateral moment was used as the basis for the calculation, the lateral force Fy may be used instead.

Figure 14:
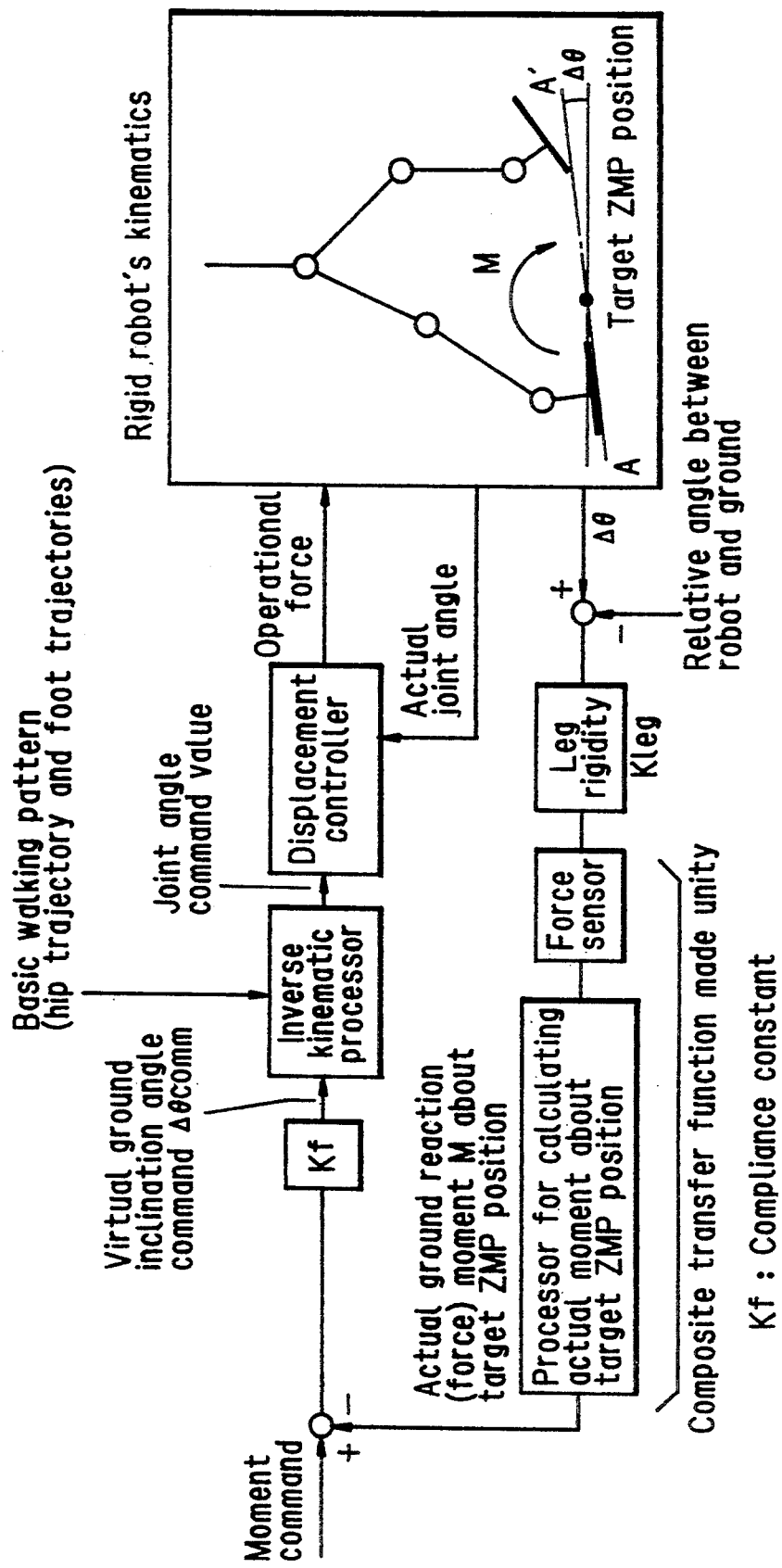
FIG. 14 is a block diagram explaining the operation of the fourth embodiment of the invention.
Figure 20:
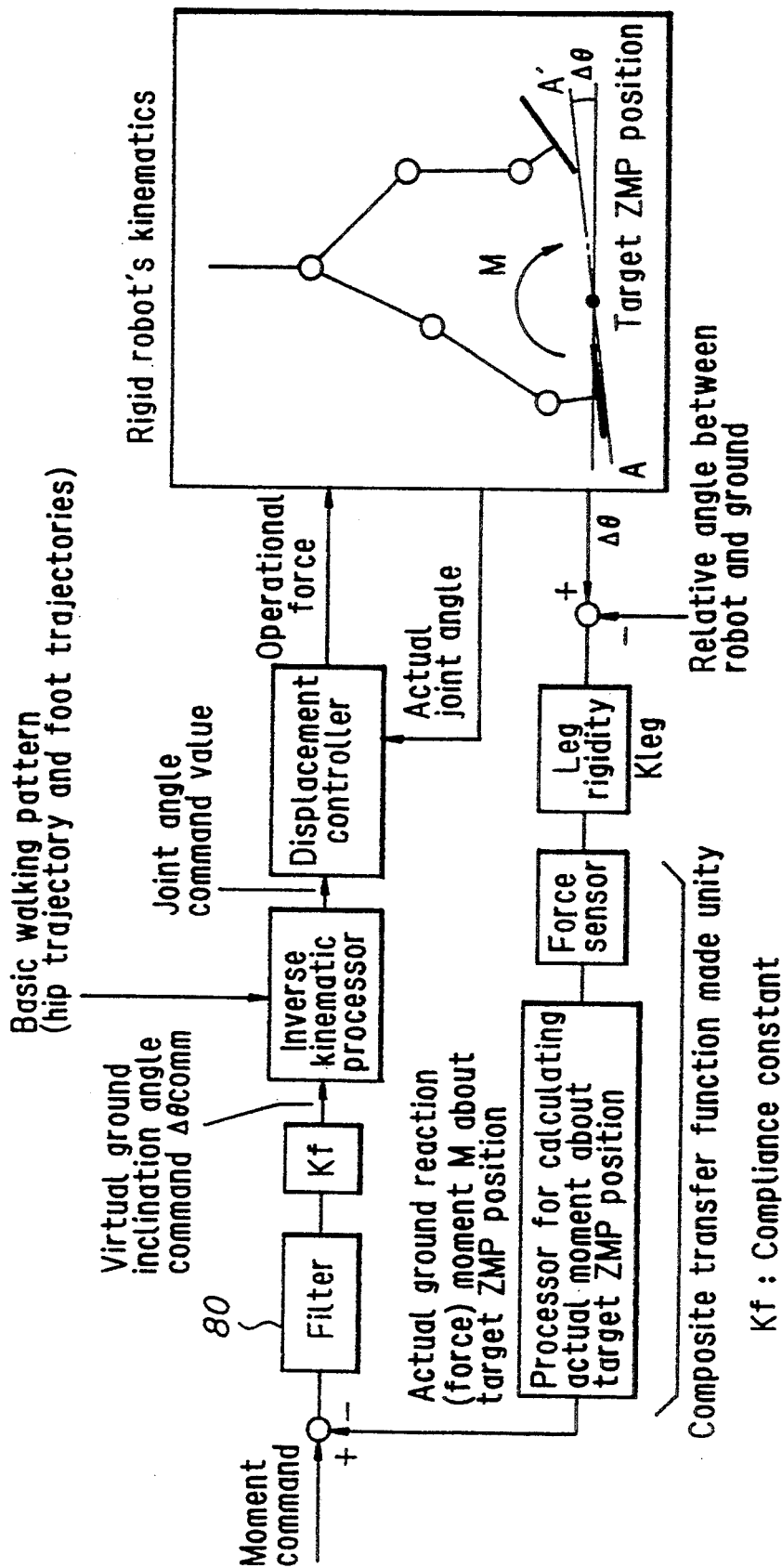
FIG. 20 is a block diagram showing an eighth embodiment of the invention in which a filter is interposed in the loop of control.

FIG. 20 shows an eighth embodiment of the invention which is constituted by inserting a filter 80 between the robot proper and the ground in the block diagram of FIG. 14 relating to the fourth embodiment. The transfer function of the filter may, for example, be $1/(1+TS)$, where T is a time constant. If the displacement controller has adequate follow-up characteristics, delta $\theta$ will coincide with delta $\theta$comm. As a result, the transfer function G from the relative angle between the robot and the ground to the actual ground reaction force moment M around the target ZMP position becomes $$G = \frac{-1}{1/2Kleg + Kf/(1 + TS)} \qquad \text{Equation 2}$$

Since $1/K\text{leg}$ is negligible if the leg rigidity Kleg is adequately high, Equation 2 gives $$G = \frac{-T}{Kf} S + \frac{-1}{Kf} \qquad \text{Equation 3}$$

Figure 21:
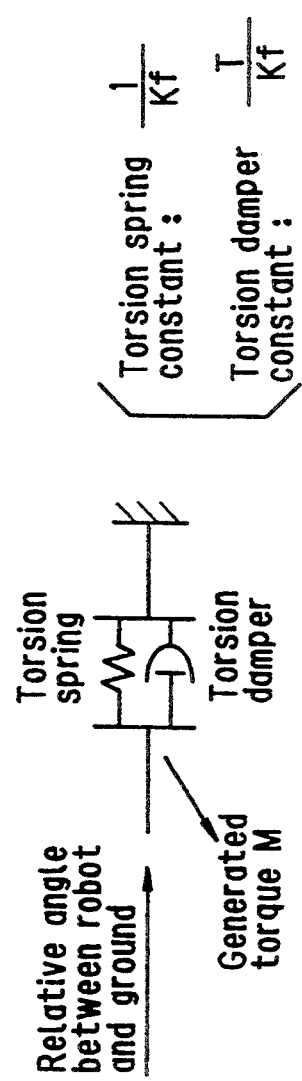
FIG. 21 is a view explaining the characteristics of the filter shown in FIG. 20.

As shown in FIG. 21, this is equivalent to a mechanism comprising a torsion spring and a torsion damper connected in parallel. Thus since it is possible to obtain an effect equivalent to that of inserting a mechanical damper between the robot itself and the ground, rebounding of the free leg after footfall can be prevented. Moreover, a secondary effect of inserting such a low-pass filter in the compliance control feedback loop is that the loop gain is lowered with respect to high frequencies, which enhances the stability of the compliance control system and prevents oscillation. Further, high-frequency noise entering via the six-dimensional force and torque sensors 36 can be removed.

FIG. 22 to 28 show a ninth embodiment.

When the aforesaid leg compliance control is not conducted in a legged mobile robot whose joints are driven using displacement control, any slight forward tilting of the robot's attitude during a two-leg support period in the course of walking causes the rearward foot to rise off the ground and the entire load to act on the forward foot. This gives rise to a very large restoration force acting to tilt the robot back again. In other words, the restoration force coefficient becomes very large during two-leg support periods. Therefore, if, with the robot in this state, attitude stabilization control should be conducted by feeding back the upper body tilt or the center of gravity deviation to the two legs' motion, the restoration force coefficient would become even larger, making it impossible to impart a sufficiently large damping effect. The robot will accordingly be destabilized. This embodiment therefore conducts attitude stabilization control in response to upper body tilt at the same time as conducting the leg compliance control described above. Although instead of conducting the aforesaid leg compliance control it is possible to impart compliance to the legs by using torque control for driving the joints, in such case the compliance characteristics corresponding to the relative position between the robot and the ground would vary greatly depending on the attitude so that the disturbance suppression characteristics corresponding to terrain irregularities and inclinations would not coincide.

The ninth embodiment will now be explained with reference to the flow charts of FIGS. 22 and 23.

Figure 22:
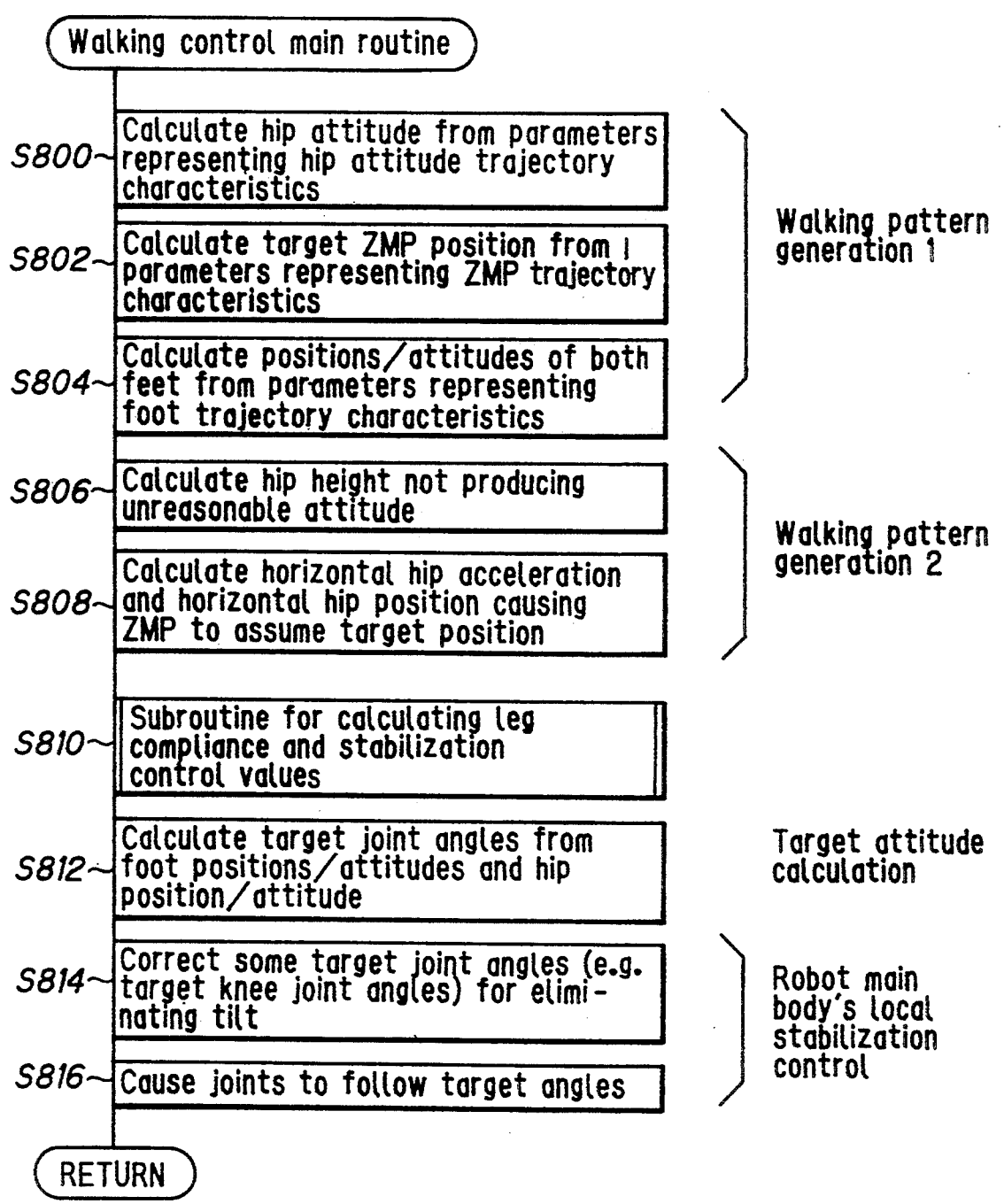
FIG. 22 is a flow chart, similar to FIG. 3, but showing the operation of a locomotion control system according to a ninth embodiment of the invention.
Figure 23:
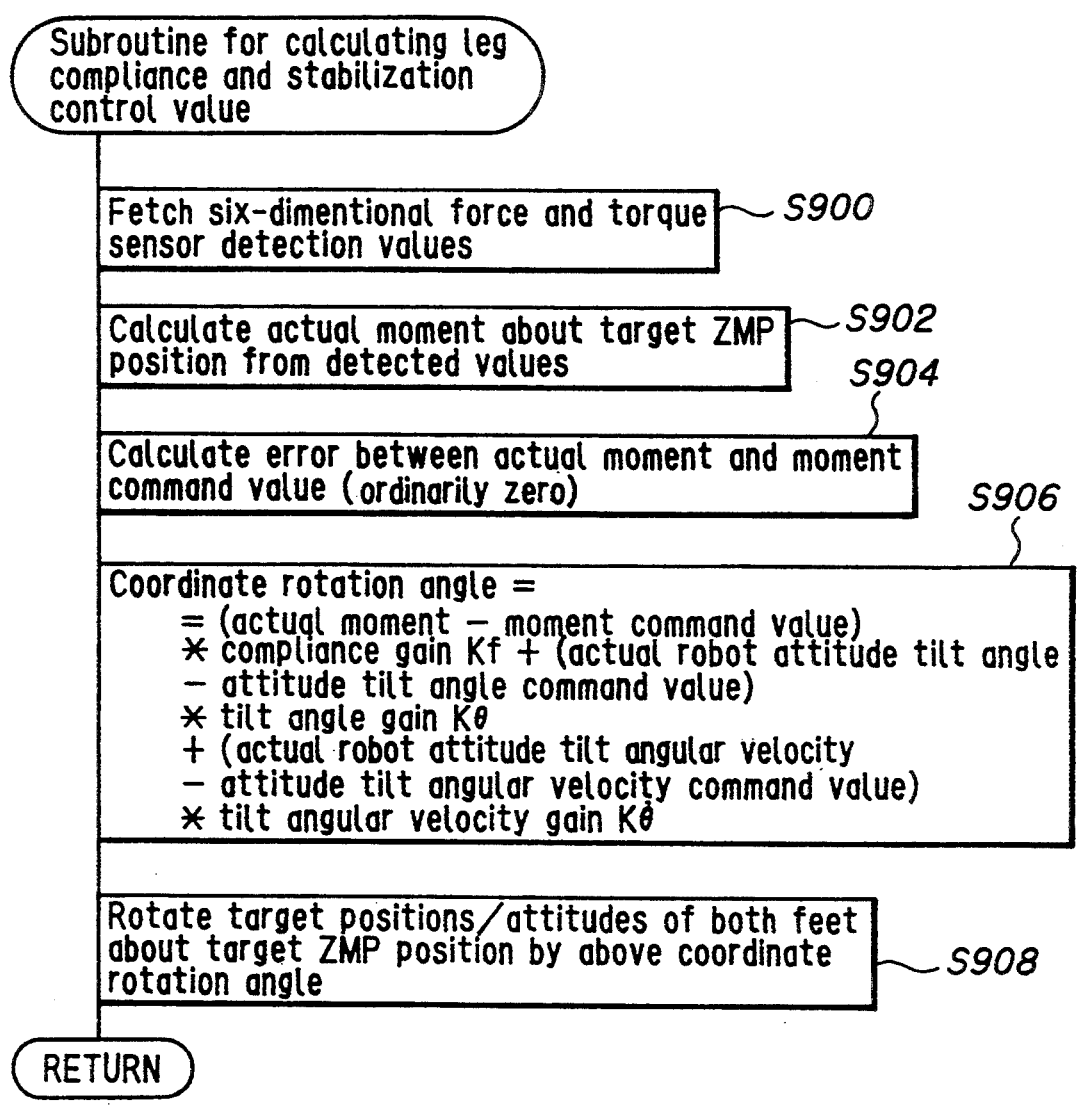
FIG. 23 is a flow chart showing a subroutine for calculating leg compliance control value and stabilization control value referred to in the flow chart of FIG. 22.

FIG. 22 is the main routine flow chart, which is similar to that of FIG. 12 explained earlier in connection with the third embodiment. The difference between this flow chart and the earlier one is that step S810 calculates not only the leg compliance control value but also stabilization control values. The subroutine for this is shown in FIG. 23. After the error between the actual moment and the command value has been determined (steps S900–S904), control passes to step S906 in which, as shown, stabilization control values obtained by multiplying the error between the actual upper body's tilt angle/angular velocity and the command values by prescribed gains are added to the leg compliance control value to obtain the coordinate rotation angle, and to step S908 in which correction to the so-obtained value is carried out. Thus, the upper body's stabilization control and the leg compliance control are conducted on the same joint(s) so that control is simplified.

Figure 24:
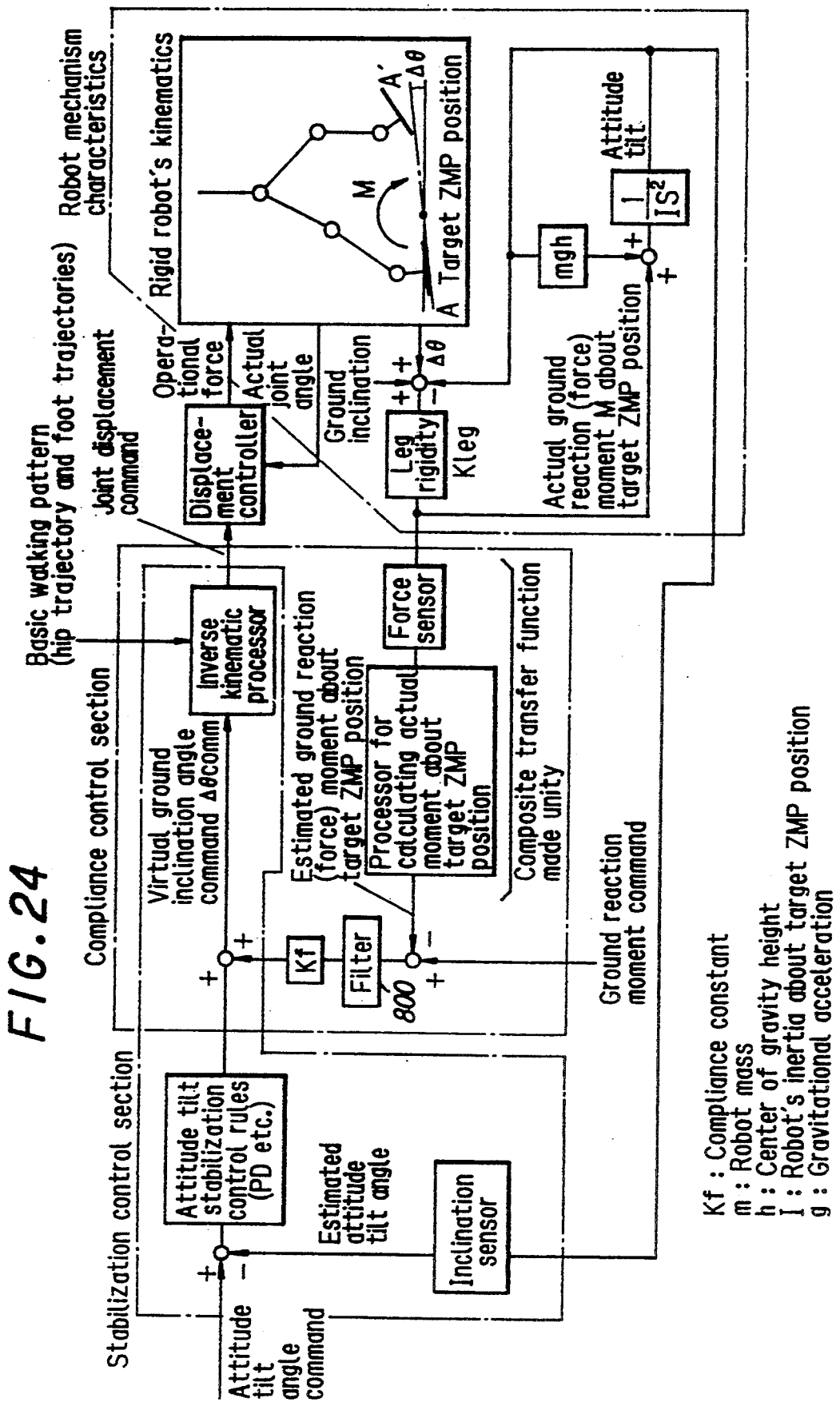
FIG. 24 is a block diagram explaining the operation of the ninth embodiment of the invention.
Figure 25:
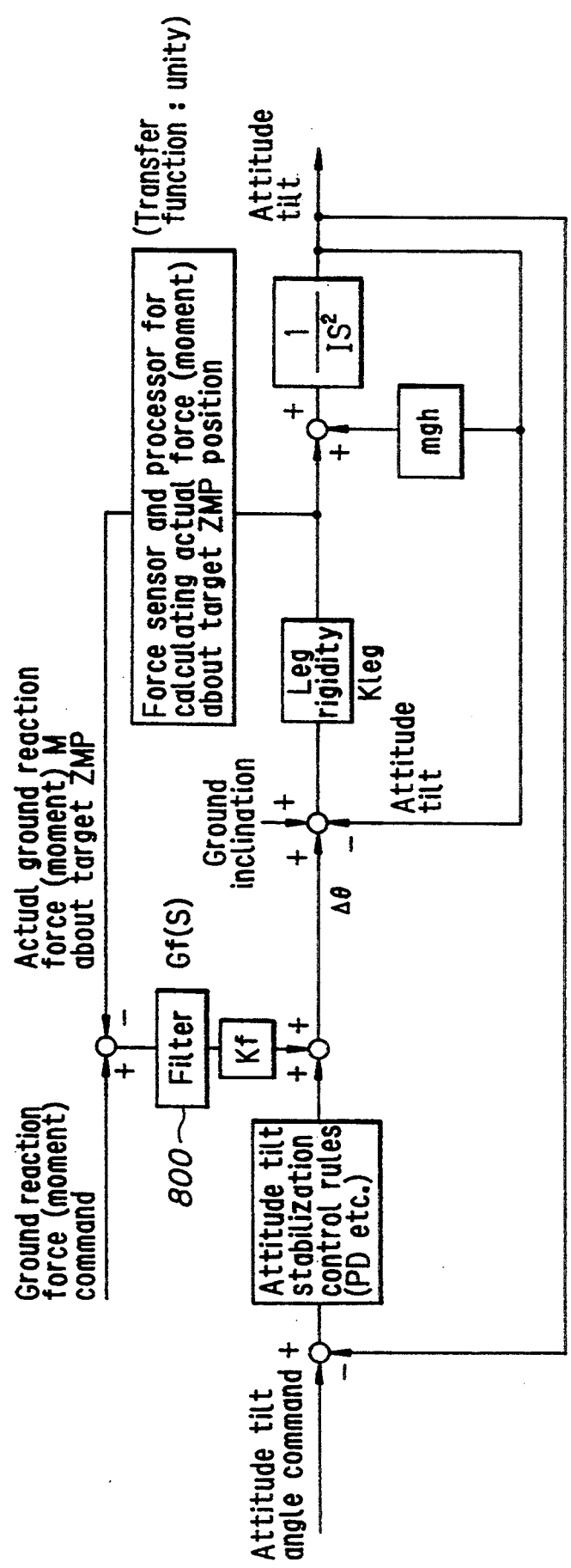
FIG. 25 is a block diagram rewritten from that shown in FIG. 24 for the illustrating it more simply.
Figure 26:
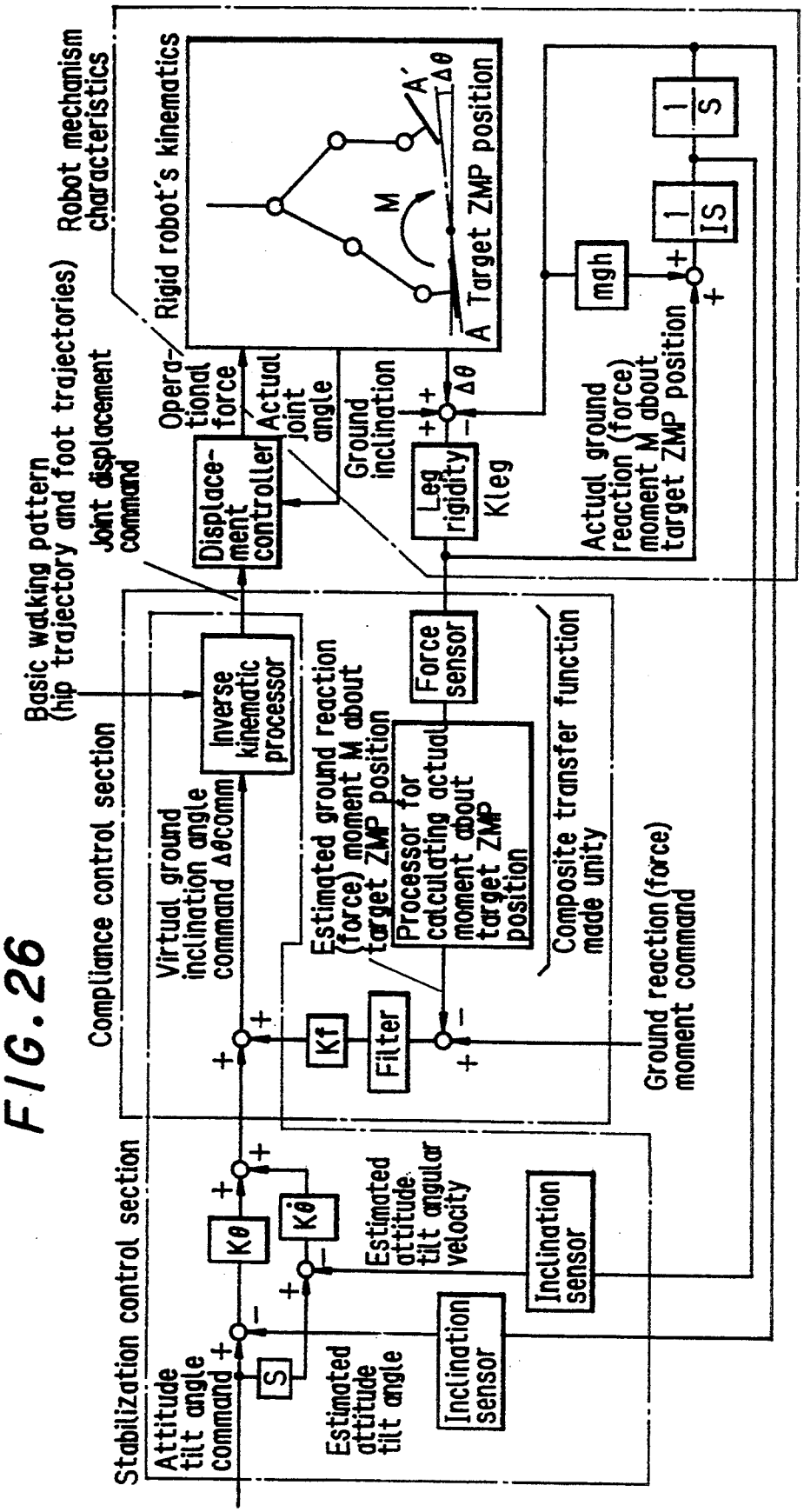
FIG. 26 is a block diagram similarly rewritten from that shown in FIG. 24 for illustrating it in a state feedback loop.

This is illustrated in the block diagram of FIG. 24. As shown, PD control is used for conducting the upper body's attitude stabilization control. If it is again assumed that delta $\theta$ coincides with delta $\theta$comm and the actual ZMP position coincides with the target ZMP position, FIG. 24 can be modified as shown in FIG. 25. As can be seen from FIG. 25, the total system obtained by combining the robot and the control system is linear. This makes it possible to apply classical control theory, modern optimal control theory, robust control theory and various other linear control theories to the attitude stabilization control. FIG. 26 shows an example using state feedback control.

Being configured in the foregoing manner, the ninth embodiment enables attitude stabilization control to be implemented without having to introduce joint torque control, which is difficult to implement because it is susceptible to the effects of joint friction and inertia. More specifically, if the displacements of the two feet are deliberately varied from the designed values, the leg compliance control produces an attitude restoration force proportional to the amount of the variation. Therefore, as the control input for producing the restoration force in the attitude stabilization control based on the upper body's tilt feedback it becomes possible to use the amount of foot displacement shift. Moreover, since the robot attitude restoration force coefficient can be maintained substantially constant during both one-leg and two-leg support periods, the robot can be simulated as an inverted pendulum that constantly maintains a fixed restoration force coefficient. Since the control characteristics are therefore approximately linear, adequate control can be realized with a linear control system. This greatly facilitates the designing of the attitude stabilization control rules. In addition, as the robot walks, the tilt of its upper body relative to the vertical can be maintained substantially at the designed value irrespective of and unaffected by any unexpected irregularities and inclinations encountered in the terrain.

Figure 27:
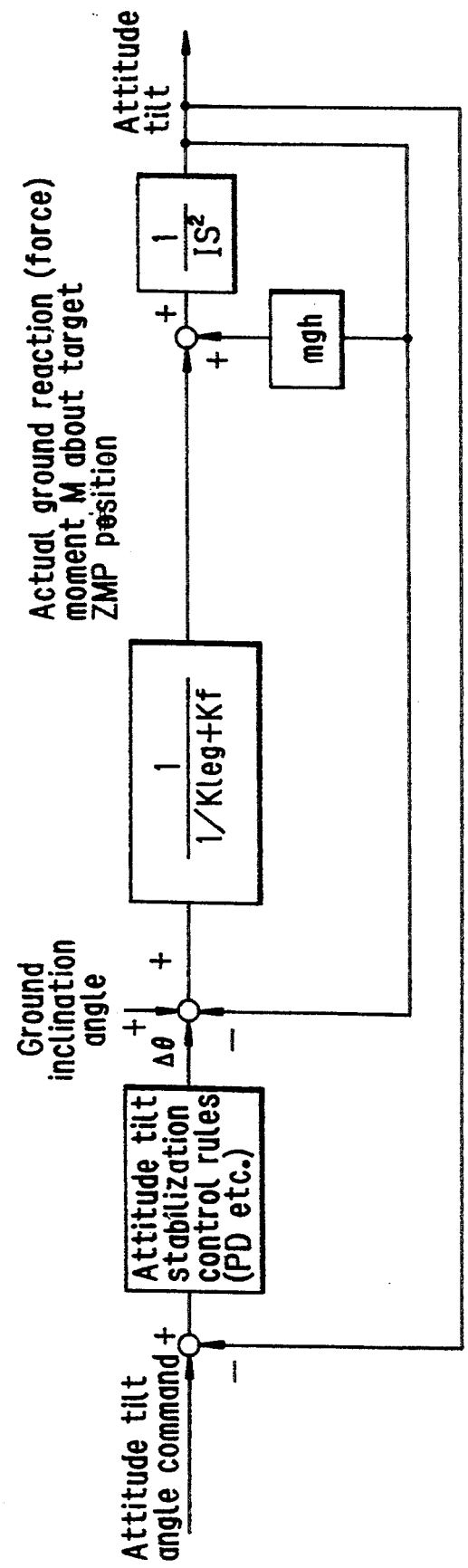
FIG. 27 is a block diagram rewritten from that shown in FIG. 25 for illustrating a case in which the characteristics of transfer function of a filter used there is made unity.
Figure 28:
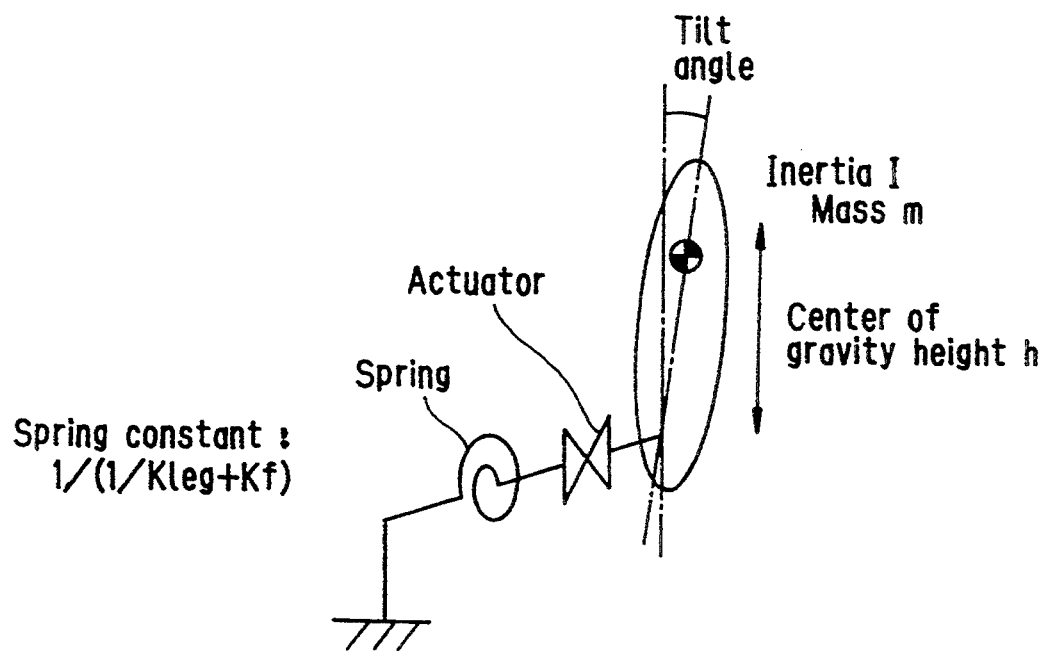
FIG. 28 is a view illustrating the configuration of FIG. 27 in a mathematical mechanical model.

While, as will be explained further later, the filter 800 shown in FIG. 25 can be of the same configuration as that described in connection with the eighth embodiment, there will now be considered another example in which the transfer characteristic of the filter is unity. So as to focus on the dynamic characteristics of the control system, assume that the ground force moment command is zero. In this case, the control shown in FIG. 25 can be modified to that shown in FIG. 27. The configuration in FIG. 27 is equivalent to the inverted pendulum with spring and actuator shown in FIG. 28. Since this simplification not only allows the application of various linear control theories but also enables the robot attitude control to be inferred from the behavior of a simple model, the optimum combination of response characteristics, various disturbance suppression characteristics and a wide range of other characteristics can be easily determined without need for repeated experimentation and simulation. As in the case of FIG. 20, the filter 800 can also be imparted with a damping effect equivalent to that of a mechanical damper. This is useful as a means for coping with leg oscillation. More specifically, as shown in FIG. 23, for enhancing stability the attitude control by feedback of the upper body's tilt angle also involves feedback of the upper body's tilt angular velocity (or of tilt the angular velocity of the straight line connecting the ground contact point and the center of gravity). However, when high-frequency vibration arises in the upper body owing to insufficient linkage rigidity or insufficient walking smoothness, large high-frequency fluctuations are produced in the tilt angular velocity. Therefore, if the tilt angular velocity feedback gain is made large, there is a danger of vibration or oscillation arising in the legs. However, use of the same filter as used in the eighth embodiment augments the tilt angular velocity feedback and increases the stability of the attitude control system. As a result, adequate stability can be secured even if the tilt angular velocity feedback gain is set low. The other effects of the eighth embodiment, such as that of preventing rebound of the free leg after footfall, are also obtained in this embodiment.

In addition to the embodiments described in the foregoing, the invention can also be realized in various other modifications. The control can be summarized as follows:

1. Detected Parameter
  a. Amount of error between target ZMP position and actual ZMP position
  b. Moment produced about target ZMP position by ground reaction force
  c. Moment produced about reference point by ground reaction force
2. Foot Motion
  a. One foot moved vertically
  b. Both feet moved vertically
  c. Foot rotated
  d. Amount of movement of foot further from target ZMP position made smaller than that of other foot
3. Horizontal motion of upper body
  a. Basic walking pattern maintained
  b. Horizontal position and acceleration corrected
4. Vertical motion of upper body
  a. Basic walking pattern maintained
  b. Hip height recalculated
5. Upper body attitude stabilization control
  a. Conducted
  b. Not conducted In view of the principle involved, it is possible to use all combinations of 1–5. The embodiments described in the foregoing are only a few examples.

Figure 29:
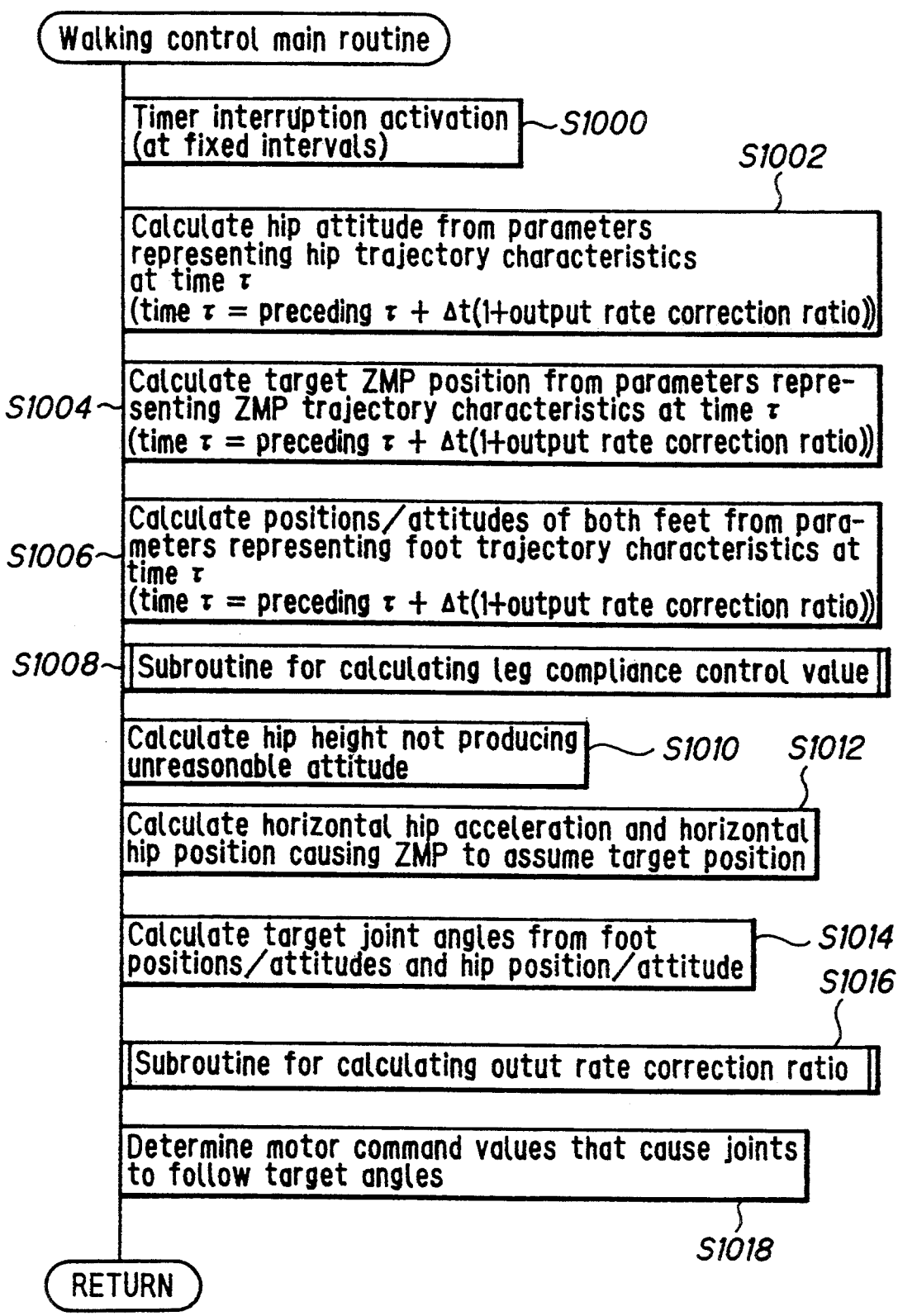
FIG. 29 is a flow chart, similar to FIG. 3, but showing the operation of a locomotion control system according to a tenth embodiment of the invention.
Figure 32:
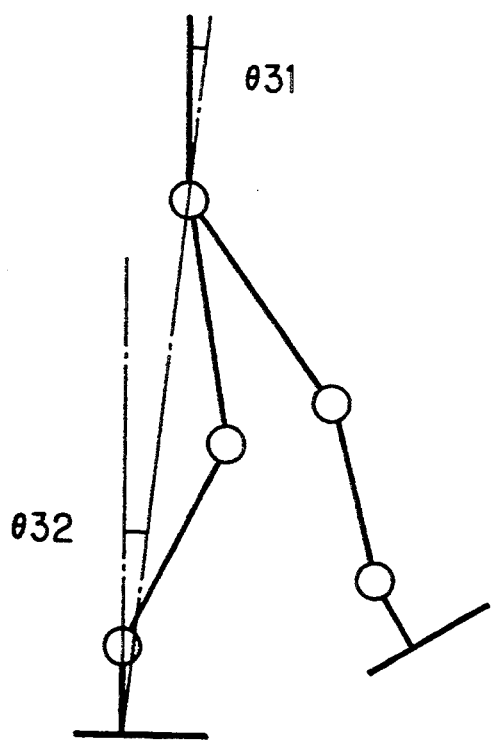
FIG. 32 is a view explaining the stabilization control according to the tenth embodiment of the invention.

FIG. 29 shows a tenth embodiment of the invention. As was mentioned earlier, where the robot's locomotion is conducted in accordance with time series walking pattern (data) predefined for each successive instant, the robot's attitude tends to become unstable when unexpected terrain irregularities are encountered. One conceivable way of coping with this problem is to vary the prescribed times of the walking pattern (data), namely the output rate of the walking pattern, according to the degree of robot instability. When a biped robot is walking forward normally, the angle $\theta 31$ that the straight line connecting the hip and the foot of the supporting leg makes with the upper body (see FIG. 32) increases monotonously with the passage of time (provided that the direction of increase shown in the figure is defined as positive). On the other hand, the angle $\theta 32$ between the straight line connecting the hip and the foot of the supporting foot and the vertical also increases monotonously (where the positive direction is similarly defined). Since the two rotations cancel each other, the attitude of the upper body relative to the ground does not tilt fore or aft but remains substantially horizontal. That is to say, $\theta 32-\theta 31$ stays nearly constant. If the output rate of the walking pattern is increased relative to the normal rate, the speed of $\theta 31$ becomes faster than normal so that the upper body tilts backward as viewed relative to the ground. Thus, when the robot is in danger of falling forward, this effect can be used to stabilize the attitude of its upper body by increasing the walking pattern (data output rate to above normal, and when the robot is in danger of falling rearward, similar results can be obtained by decreasing the walking pattern (data) output rate to below normal. This attitude stabilization effect manifests itself immediately, without waiting for the next footfall. The change in the footfall timing may, however, also have a stabilizing effect.

Figure 33:
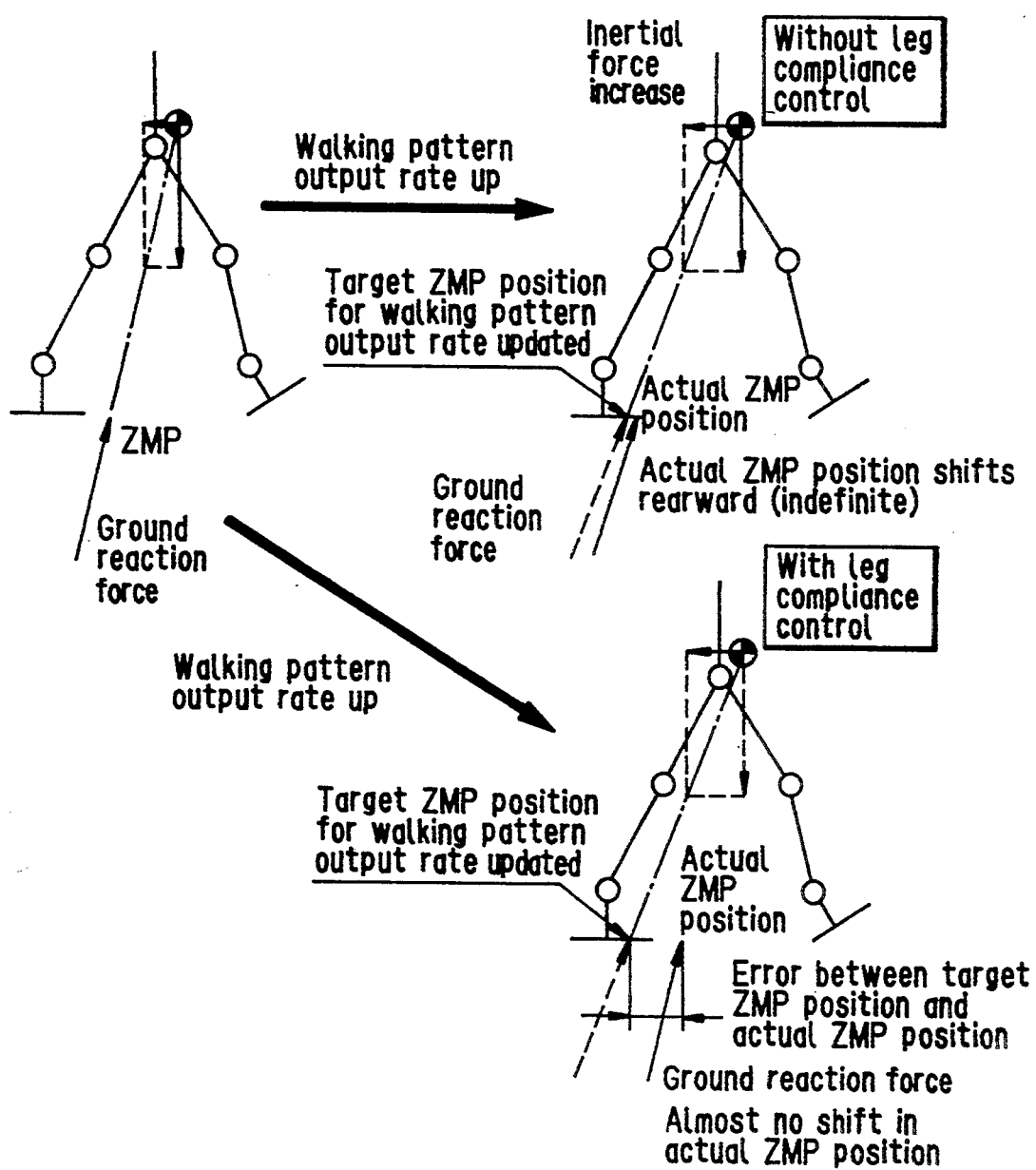
FIG. 33 is a view similarly explaining the stabilization control according to the tenth embodiment of the invention.

This method nevertheless entails a problem. When the aforesaid leg compliance control of, for example, the type proposed in the applicant's co-filed Japanese patent application is applied to the ankle of the supporting leg during one-leg support periods, the position of the ZMP is virtually unchanged by moderate changes in the angle between the ankle and the ground. Because of this, there is also substantially no change in the behavior of the center of gravity of the upper body, which accounts for most of the robot's mass. In other words, changing the output rate of the walking pattern causes almost no change in the behavior of $\theta 32$. In contrast, if during two-leg support periods an attempt is made to raise the walking pattern output rate above the normal rate while maintaining the attitude of the upper body, then, owing to the fact that the forces are balanced such as shown in FIG. 33, the position of the ZMP moves rearward from the design position. Thus, the ZMP cannot be moved to the rear during one-leg support periods, which is what makes it possible to achieve the aforesaid change in attitude, but during two-leg support periods it may move back to the rear foot, owing to the fact that the feet are tensed in both up/down and fore-/aft directions, and notwithstanding any compliance control of the proposed type applied to the ankle during footfall. Therefore, if the forward speed of the upper body is increased too much by raising the output of the walking pattern above normal, the ground reaction vector will be able to move onto an extension of the vector of the weight and inertial force, whereby the attitude of the upper body will be maintained. Thus, differently from in the one-leg support periods, it is not possible to control the attitude of the upper body by changing the output rate of the walking pattern. Moreover, if the output rate of the walking pattern is raised above normal, the acceleration of the robot caused by the rearward shift of the ZMP position may make the robot more, not less, susceptible to tip-over in the following one-leg support period.

The tenth embodiment of this invention is therefore to provide a locomotion control system for a legged mobile robot whose walking is controlled by predefined time series walking pattern (data) for each successive instant, which system enables the robot to maintain a stable attitude in all walking phases, during both one-leg support periods and two-leg support periods, irrespective of any unexpected terrain irregularities encountered.

The tenth embodiment will now be explained with reference to the flow chart of FIG. 29.

First, in step S1000, the routine is activated by timer interruption. Activation occurs at fixed intervals. Control then passes to step S1002 in which the aforesaid hip attitude is calculated from the parameters representing the position at time $\tau$. Next, in step S1004, the target ZMP position is calculated from the parameters representing the characteristics of the ZMP trajectory at the same time. Control then passes to step S1006 in which the positions and attitudes of both feet are calculated from the parameters representing the foot trajectories at the same time. Then passing through steps S1008 to S1014 relating to the leg compliance control value calculation or the like similarly as the foregoing embodiments, control then passes to step S1016 in which the walking pattern output rate correction ratio is determined.

Figure 30:
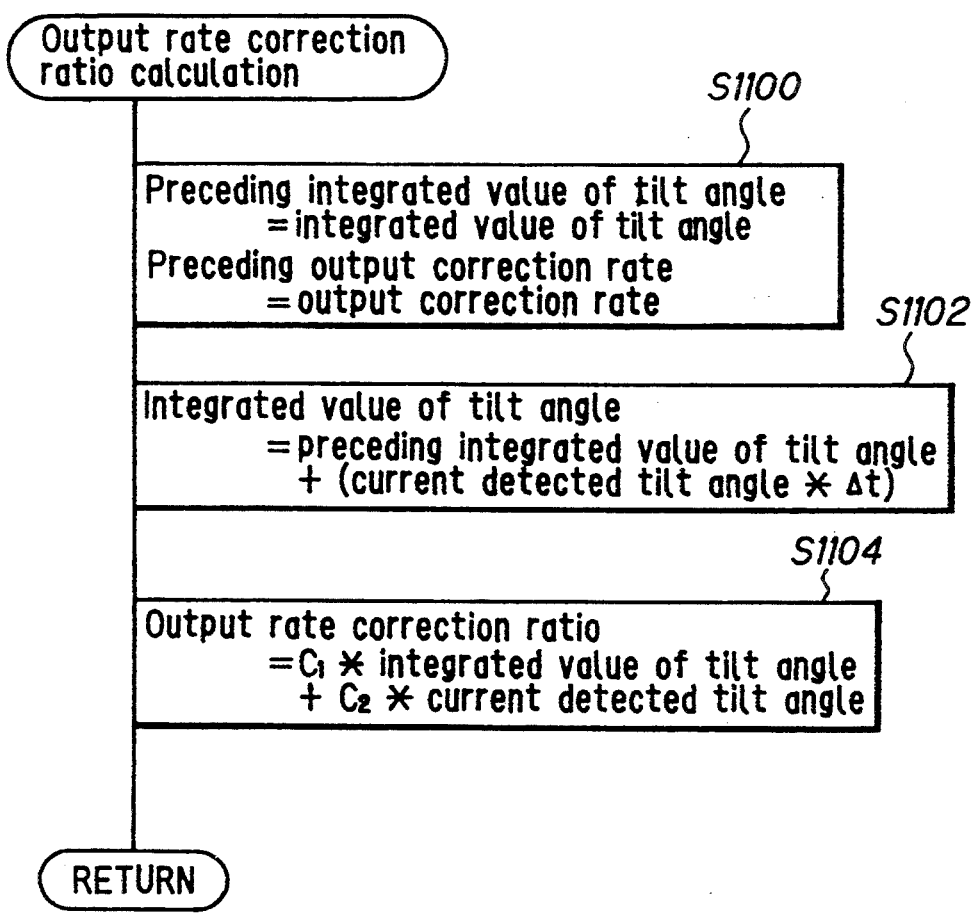
FIG. 30 is a flow chart showing a subroutine for calculating walking pattern output rate correction ratio referred to in the flow chart of FIG. 29.
Figure 31:
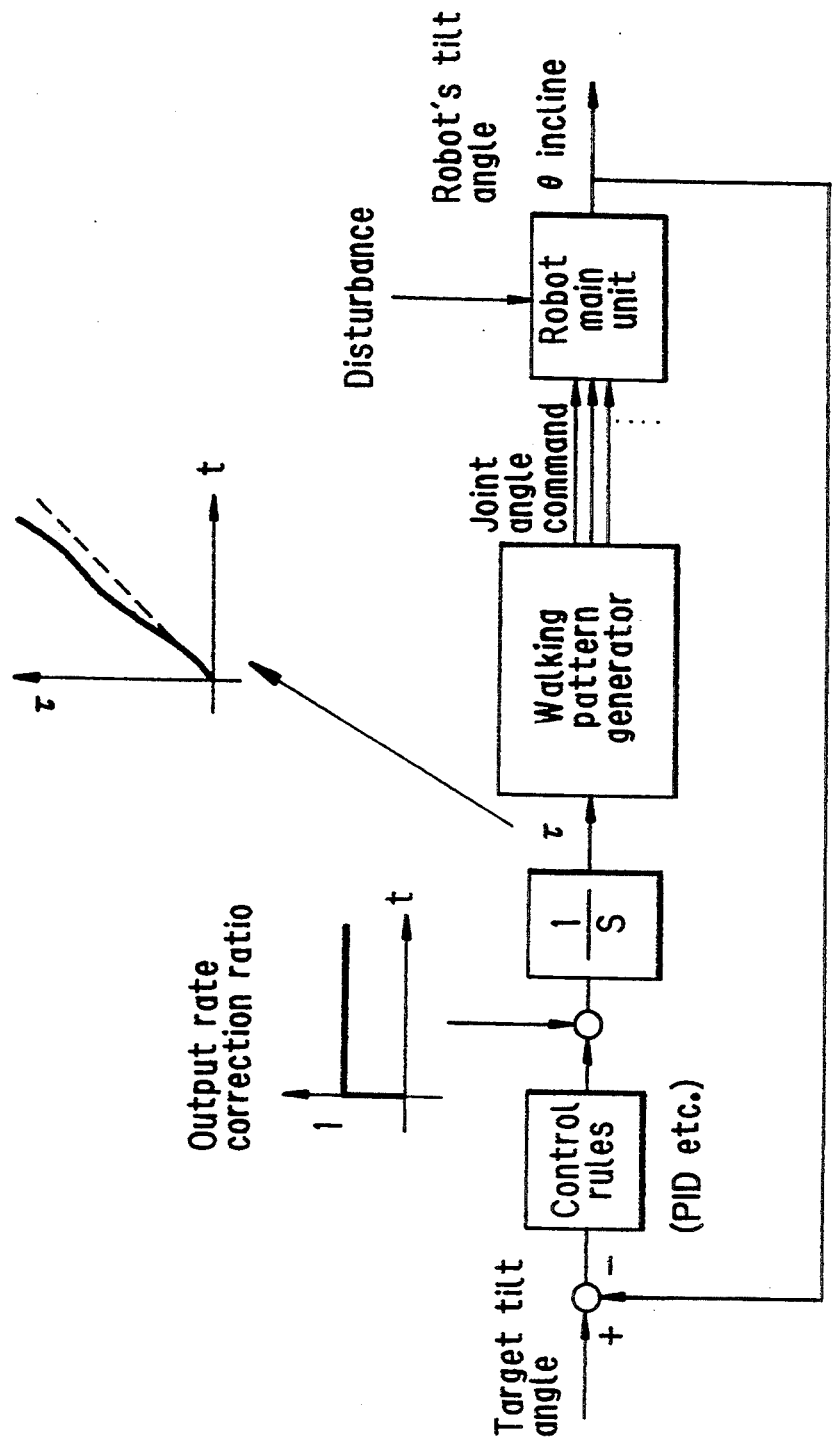
FIG. 31 is a block diagram showing the operation of the tenth embodiment of the invention.

The subroutine for this is shown in FIG. 30. First, in step S1100, the integrated value of the tilt angle detected by the inclination sensor 40 up to the current time and the output rate correction ratio up to the current time are redefined as the values thereof in the preceding cycle. Control then passes to step S1102 in which the product of the tilt angle detected in the current cycle and delta t is added to the integrated value of the tilt angle in the preceding cycle (as redefined in step S1100) to obtain the new integrated value, and to step S1104 in which the product of the new integrated value and $C_1$ and the product of the tilt angle detected in the current cycle and $C_2$ are added together to obtain the output rate correction ratio. ($C_1$ and $C_2$ are constants.) The values of these constants are appropriately selected and the output rate correction ratio is determined as a function of the tilt angle integrated in the foregoing manner. This will be better understood from FIG. 31. When the robot is walking stably, the output rate correction ratio is defined as 1 and, as a result, the walking pattern is output in accordance with the predefined normal rate characteristic. Now assume that the robot tilts so that its attitude becomes unstable. If the output rate correction ratio is varied from 1 in proportion to the tilt angle, the rate characteristic relative to time will change. Specifically, the output rate of the walking pattern is raised above normal (the output rate correction ratio is made smaller than 1) when the robot tilts forward and is lowered below normal (larger than 1) when the robot tilts rearward.

Control next passes to step S1018 of the flow chart of FIG. 29 in which the aforesaid motor command values are determined so as to cause the angles of the twelve joints to follow the target angles.

Since the tenth embodiment varies the output rate of the walking pattern in proportion to the tilt angle, the robot can rapidly restore itself to a stable attitude after experiencing destabilization owing to unexpected irregularities encountered in the terrain. At the same time, moreover, the ZMP during two-leg support periods is controlled to stay constantly at the target position (as shown in FIG. 33), and, therefore, the earlier mentioned problem of changes in output rate during two-leg support periods contributing to tip-over does not arise. This is because the introduction of the leg compliance control makes it possible to vary the relationship between the target and actual ZMP positions as desired so that the two can be deliberately offset from each other in order to make it possible to use variations in the output rate for freely manipulating the robot's attitude also during two-leg support periods.

While the foregoing description relates to an example in which the time of the walking pattern's string data is varied, it is alternatively possible to vary the interruption activation interval in step S1000 of FIG. 29. Regarding the predefined data, moreover, the walking pattern may be defined as strings of angle data for the joints at fixed time intervals or as strings of data for the hip and foot position/attitude and the ZMP trajectory at fixed time intervals.

While the tilt angle and the integrated value thereof were used in the flow chart of FIG. 30 of the tenth embodiment, the differentiated value thereof can also be taken into consideration. And, the compliance operation can be different from that illustrated.

Although the control was explained with reference to stabilizing the robot's attitude against unexpected terrain irregularities, the invention can also be applied for harmonizing the robot's walking with what is required for negotiating stairs, railroad crossties and other environments which place limits on locomotion.

In the foregoing embodiments, although the robot's locomotion was conducted based on the walking pattern predesigned in advance, it may alternatively possible to apply, except for the tenth embodiment, to a system in which the walking pattern is determined real time during walking.

Moreover, while the invention wad described with reference to a biped walking robot as an example of a legged walking robot, the invention can also be applied to legged robot other than the biped one.

Furthermore, the present invention has thus been shown and described with reference to the specific embodiments. However, it should be noted that the present invention is in no way limited to the details of the described arrangements, changes and modifications may be made without departing from the scope of the appended claims.

What is claimed is:

1. A system for controlling locomotion of a legged mobile robot having a body and a plurality of articulated legs each connected to the body through a first joint and each having at least a second joint, comprising:

motor means provided at the individual joints;

first means for determining control values of the motor means in accordance with a walking data preestablished at least on a trajectory of ZMP (Zero Moment Point) at which horizontal moment acting on the robot generated by ground reaction force is zero;

second means for detecting ground reaction force actually acting on the robot to determine an actual position of the ZMP;

third means for comparing the actual position of the ZMP with a target position of the ZMP obtained from the trajectory of the ZMP to determine an error therebetween;
and control means for providing the determined control value to said motor means to drive the individual joints and when the error is determined, correcting at least one of the control values in such a manner that the error decreases.

2. A system according to claim 1, wherein said control means corrects at least one of the control value in such a manner that one leg's distal end contacting the ground is driven in a predetermined direction.

3. A system according to claim 2, wherein the predetermined direction is the vertical direction with respect to the ground.

4. A system according to claim 2, wherein said control means corrects at least one of the control values in such a manner that the ground is virtually rotated about a point while maintaining a positional relationship between the leg's distal end and the ground.

5. A system according to claim 4, wherein the point is the target ZMP position.

6. A system according to claim 2, wherein said control means corrects at least one of the control values in such a manner that the ground is virtually rotated about a point while maintaining a positional relationship between the legs' distal ends and the ground.

7. A system according to claim 6, wherein the point is the target ZMP position.

8. A system according to claim 6, wherein an amount of control value correction is made smaller for the leg's distal end which is farther from the point than that for the other.

9. A system according to claim 1, wherein said control means corrects at least one of the control values in such a manner that one leg's distal end contacting the ground is driven in a predetermined direction while that another leg is driven in a direction opposite thereto.

10. A system according to claim 9, wherein the predetermined direction is the vertical direction with respect to the ground.

11. A system according to claim 1, wherein said second means detects the ground reaction force through a low-pass filter.

12. A system according to claim 1, wherein the legged mobile robot is a biped robot.

13. A system for controlling locomotion of a legged mobile robot having a body and a plurality of articulated legs each connected to the body through a first joint and each having at least a second joint, comprising:

motor means provided at the individual joints;

first means for determining control values of the motor means in accordance with a walking data;

second means for detecting ground reaction moment generated about a reference third means for comparing the detected moment with a predetermined value to determine an error therebetween;

control means for providing the determined control values to said motor means to drive the individual joints and when the error is determined correcting at least one of the control values in such a manner that the error decreases: and wherein said first means determines the control values of the motor means in accordance with the walking data preestablished at least on a trajectory of ZMP (Zero Moment Point) at which horizontal moment acting on the robot generated by ground reaction force is zero, and said second means detects the ground reaction moment generated about a target position of the ZMP obtained from the trajectory of the ZMP.

14. A system according to claim 13, wherein said control means corrects at least one of the control values in such a manner that one leg's distal end contacting the ground is driven in a predetermined direction.

15. A system according to claim 14, wherein the predetermined direction is the vertical direction with respect to the ground.

16. A system according to claim 14, wherein said control means corrects at least one of the control values in such a manner that the ground is virtually rotated about a point while maintaining a positional relationship between the leg's distal end and the ground.

17. A system according to claim 16, wherein the point is the target ZMP position.

18. A system according to claim 13, wherein said control means corrects the control values in such a manner that one leg's distal end contacting the ground is driven in a predetermined direction while that another leg is driven in a direction opposite thereto.

19. A system according to claim 18, wherein the predetermined direction is the vertical direction with respect to the ground.

20. A system according to claim 18, wherein said control means corrects the control values in such a manner that the ground is virtually rotated about a point while maintaining a positional relationship between the legs' distal ends and the ground.

21. A system according to claim 20, wherein the point is the target ZMP position.

22. A system according to claim 20, wherein an amount of control value correction is made smaller for the leg's distal end which is farther from the point than that for the other.

23. A system for controlling locomotion of a legged mobile robot having a body and a plurality of articulated legs each connected to the body through a first joint and each having at least a second joint, comprising:
  motor means provided at the individual joints;
  first means for determining control values of the motor means in accordance with a walking data preestablished at least on a trajectory of ZMP (Zero Moment Point) at which horizontal moment acting on the robot generated by ground reaction force is zero and on a target attitude of the robot body;
  second means for detecting ground reaction force or moment acting on the robot to determine an actual position of the ZMP;
  third means for comparing the actual position of the ZMP with a target position of the ZMP obtained from the trajectory of the ZMP to determine an error therebetween;
  and
  control means for providing the determined control values to said motor means to drive the individual joints and when the error is determined, correcting at least one of the control values in such a manner that the error decreases.

24. A system according to claim 23, wherein said control means corrects at least one of the control values determining the attitude of the robot body in response to the control value correction made for the error.

25. A system according to claim 23, wherein said control means corrects at least one of the control values in such a manner that one leg's distal end contacting the ground is driven in a predetermined direction.

26. A system according to claim 25, wherein the predetermined direction is the vertical direction with respect to the ground.

27. A system according to claim 25, wherein said control means corrects at least one of the control values in such a manner that the ground reaction force is virtually rotated about a point while maintaining a positional relationship between the leg's distal end and the ground.

28. A system according to claim 27, wherein the point is the target ZMP position.

29. A system according to claim 23, wherein said control means corrects at least one of the control values in such a manner that one leg's distal end contacting the ground is driven in a predetermined direction while that another leg is driven in a direction opposite thereto.

30. A system according to claim 29, wherein the predetermined direction is the vertical direction with respect to the ground.

31. A system according to claim 29, wherein said control means corrects at least one of the control values in such a manner that ground is virtually rotated about a point while maintaining a positional relationship between the legs' distal ends and the ground.

32. A system according to claim 31, wherein the point is a target ZMP position.

33. A system according to claim 31, wherein amount of control value correction is made smaller for the leg's distal end which is farther from the point than that for the other.

34. A system according to claim 23, wherein said second means detects the ground reaction force through a low-pass filter.

35. A system according to claim 23, wherein the legged mobile robot is a biped robot.

36. A system for controlling locomotion of a legged mobile robot having a body and a plurality of articulated legs each connected to the body through a first joint and each having at least a second joint, comprising:
  motor means for provided at the individual joints;
  first means for determining time series control values of the motor means in accordance with a time series walking data preestablished at least on a trajectory of ZMP (Zero Moment Point) at which horizontal moment acting on the robot generated by ground reaction force is zero;
  second means for detecting a ground reaction force actually acting on the robot to determine an actual position of the ZMP;
  third means for comparing the actual position of the ZMP with a target position of the ZMP obtained from the trajectory of the ZMP to determine an error therebetween;
  fourth means for detecting unstable condition of the robot; and
  control means for providing the determined time series control values to said motor means at a prescribed interval to drive the individual joints and when the error is determined, correcting at least one of the control values in such a manner that the error decreases, said control means changing the interval when the unstable condition is detected.

37. A system according to claim 36, wherein said fourth means detects the unstable condition of the robot through an inclination sensor mounted on the robot.

38. A system according to claim 36, wherein the unstable condition is a condition in which an external force acts on the robot.

* * * * *